US011362852B2

(12) United States Patent
Deligio et al.

(10) Patent No.: US 11,362,852 B2
(45) Date of Patent: Jun. 14, 2022

(54) SYSTEMS AND METHODS FOR CONFIGURING AND OPERATING BUILDING EQUIPMENT USING CAUSAL AND SPATIAL RELATIONSHIPS

(71) Applicant: Johnson Controls Technology Company, Auburn Hills, MI (US)

(72) Inventors: Dominick M. Deligio, Lake Villa, IL (US); Jason T. Sawyer, Greendale, WI (US); Dimitrios S. Papadopoulos, Westwood, NJ (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/406,994

(22) Filed: May 8, 2019

(65) Prior Publication Data

US 2020/0358630 A1 Nov. 12, 2020

(51) Int. Cl.
*H04L 12/28* (2006.01)
*G06F 16/909* (2019.01)

(52) U.S. Cl.
CPC ........ *H04L 12/2809* (2013.01); *G06F 16/909* (2019.01); *H04L 12/2816* (2013.01); *H04L 12/2827* (2013.01)

(58) Field of Classification Search
CPC ............. H04L 12/2809; H04L 12/2816; H04L 12/2827; G06F 16/909
See application file for complete search history.

(56) References Cited

U.S. PATENT DOCUMENTS

| | | | | |
|---|---|---|---|---|
| 7,904,209 | B2* | 3/2011 | Podgorny | G05B 15/02 700/276 |
| 10,012,967 | B2* | 7/2018 | Lucas | H04L 63/104 |
| 10,157,613 | B2* | 12/2018 | Saxena | G06F 3/167 |
| 2003/0078677 | A1* | 4/2003 | Hull | H04L 12/2816 700/1 |
| 2004/0143474 | A1* | 7/2004 | Haeberle | G06Q 50/163 705/314 |
| 2007/0233323 | A1* | 10/2007 | Wiemeyer | H04L 43/0817 700/276 |
| 2008/0236763 | A1* | 10/2008 | Kates | F24F 11/30 160/5 |
| 2009/0308543 | A1* | 12/2009 | Kates | E06B 9/50 160/5 |

(Continued)

OTHER PUBLICATIONS

U.S. Appl. No. 15/949,233, filed Apr. 10, 2018, Reichl, Gregory.

*Primary Examiner* — Charles R Kasenge
(74) *Attorney, Agent, or Firm* — Foley & Lardner LLP

(57) ABSTRACT

A building management system comprising a database storing relationships between a plurality of building objects representing building equipment and building spaces and a configuration tool. The configuration tool is configured to obtain configuration data associated with a first building object of the plurality of building objects and use the relationships between the plurality of building objects to identify a second building object having a stored relationship with the first building object. The configuration tool is also configured to automatically generate configuration data for the second building object based on the configuration data associated with the first building object and the relationship with the second building object.

16 Claims, 28 Drawing Sheets

(56) References Cited

U.S. PATENT DOCUMENTS

| | | | |
|---|---|---|---|
| 2010/0011311 A1* | 1/2010 | Kodosky | G05B 19/0426 715/771 |
| 2011/0087650 A1 | 4/2011 | Mackay et al. | |
| 2013/0085719 A1* | 4/2013 | Brun | G06F 8/24 703/1 |
| 2013/0086066 A1* | 4/2013 | Anderson, Jr. | H04L 41/12 707/737 |
| 2013/0113284 A1* | 5/2013 | Altonen | F24F 11/30 307/31 |
| 2013/0144955 A1* | 6/2013 | Bodin | H04L 61/2015 709/205 |
| 2013/0261799 A1* | 10/2013 | Kuhlmann | E06B 9/32 700/275 |
| 2014/0129180 A1* | 5/2014 | Mackay | G06Q 10/06 702/189 |
| 2015/0120003 A1* | 4/2015 | Kobori | F24F 11/30 700/19 |
| 2016/0234186 A1* | 8/2016 | Leblond | H04L 63/08 |
| 2016/0314395 A1* | 10/2016 | Sublett | G06N 5/025 |
| 2016/0378306 A1* | 12/2016 | Kresl | G06F 8/38 715/781 |
| 2017/0046012 A1* | 2/2017 | Han | G06Q 10/00 |
| 2017/0090441 A1* | 3/2017 | Schmitt | G05B 15/02 |
| 2018/0088789 A1* | 3/2018 | Han | G05B 15/02 |
| 2018/0119975 A1* | 5/2018 | Park | G06F 21/602 |
| 2019/0109725 A1 | 4/2019 | Duraisingh | |

* cited by examiner

FIG. 6B

| Item | Command | Priority | Delay |
|---|---|---|---|
| Actions for Condition: Occupied | | | |
| NAE04 BLDG C Occ Sched | Occupied | 15 (Scheduling) | 0 seconds |
| NAE04 BLDG C 4 Occ Sched | Occupied | 15 (Scheduling) | 0 seconds |
| NAE04 BLDG C 5 Occ Sched | Occupied | 15 (Scheduling) | 0 seconds |
| NAE04 BLDG C 6 Occ Sched | Occupied | 15 (Scheduling) | 0 seconds |
| Actions for Condition: Unoccupied | | | |
| NAE04 BLDG C Occ Sched | Unoccupied | 15 (Scheduling) | 300 seconds |
| NAE04 BLDG C 4 Occ Sched | Unoccupied | 15 (Scheduling) | 300 seconds |
| NAE04 BLDG C 5 Occ Sched | Unoccupied | 15 (Scheduling) | 300 seconds |
| NAE04 BLDG C 6 Occ Sched | Unoccupied | 15 (Scheduling) | 300 seconds |
| Actions for Condition: Standby | | | |
| NAE04 BLDG C Occ Sched | Standby | 15 (Scheduling) | 300 seconds |
| NAE04 BLDG C 4 Occ Sched | Standby | 15 (Scheduling) | 300 seconds |
| NAE04 BLDG C 5 Occ Sched | Standby | 15 (Scheduling) | 300 seconds |
| NAE04 BLDG C 6 Occ Sched | Standby | 15 (Scheduling) | 300 seconds |
| Actions for Condition: Not Set | | | |

States Text: Occ Scheduled
Number of States: 4
Relinquish Default: Occupied

507-B4F1-AHU-411 Schedule

SYSTEMS AND METHODS FOR CONFIGURING AND OPERATING BUILDING EQUIPMENT USING CAUSAL AND SPATIAL RELATIONSHIPS

BACKGROUND

The present disclosure relates generally to a building management system (BMS). The present disclosure relates more particularly to automatically managing building equipment based on information associated with spaces and building equipment configurations. The present disclosure relates more particularly still to automatically manipulating multiple pieces of building equipment knowing only the configuration of one piece of building equipment.

Previous system logic and optimization can be complicated to program and implement in BAS systems because they require knowledge of the configurations of each piece of building equipment to operate effectively. If there is any error or gap in knowledge related to equipment configurations, pieces of building equipment can end up fighting against each other when serving an area of a building. Even if the building equipment is not fighting against each other, the building equipment may not operate in line with each other, causing performance inefficiencies.

For example, if two fan coil units are set up to heat or cool a room depending on the users desired result, the user would have to manually set up the configuration of each fan coil unit to ensure they are both operating properly. In some instances, if a user does not set up each fan coil unit correctly, one fan coil unit could operate to cool the room while the other fan coil unit operates to heat the room. It would desirable to provide a system that could automatically control and/or connect both fan coil units while only configuring or knowing the configuration of one of the fan coil units.

SUMMARY

In one implementation of the present disclosure, a building management system comprising a database and a configuration tool is provided. The database stores relationships between a plurality of building objects representing building equipment and building spaces. The configuration tool is configured to obtain configuration data associated with a first building object of the plurality of building objects, use the relationships between the plurality of building objects to identify a second building object having a stored relationship with the first building object; and automatically generate configuration data for the second building object based on the configuration data associated with the first building object and the relationship with the second building object.

In some embodiments, the first building object represents a building space of the building spaces and the second building object represents a piece of building equipment of the building equipment.

In some embodiments, the configuration data associated with the building space represents a configuration of each piece of building equipment that serves the building space.

In some embodiments, the relationships between the plurality of building objects represent connections between different pieces of building equipment that cooperate to perform a common function.

In some embodiments, the configuration tool is configured to obtain configuration data based on a configuration schedule and the configuration schedule is based on at least one of static pressure reset strategies, warm-up/cool-down strategies, heating schedules, cooling schedules, night setback strategies, discharge air temperature, demand ventilation, demand response, pressure dependent zoning, central plant optimization, model predictive/artificial intelligence control, heavy equipment delay, alarm suppression, global data shares, interlocks, multiple commands, and fire emergency strategies.

In some embodiments, the configuration tool is further configured to identify a space object representative of a building space based on the configuration schedule and the first building object is representative of building equipment that serves the building space.

In some embodiments, the configuration tool is further configured to identify a change in configuration data of the first building object and, in response to identifying the change, automatically change the configuration data of the second building object.

In some embodiments, the configuration tool is further configured to tag the first building object with a first configuration tag representing the current configuration of the first building object and tag the second building object with a second configuration tag corresponding to the first configuration tag.

In some embodiments, the first building object is a space object associated with a building space and the configuration tool is further configured to tag the space object with tags representing pieces of building equipment that serve the building space and identify a first equipment object associated with one piece of building equipment of the pieces of building equipment as the second building object. The configuration tool is also configured to generate configuration data for equipment objects representing the other pieces of building equipment associated with the building space based on the automatically generated configuration data associated with the first equipment object.

In some embodiments, the first building object is a space object representative of a building space of the building spaces and the configuration tool is configured to obtain configuration data associated with the first building object based on a mode of operation that controls the configurations of the building equipment that serve the space.

In another implementation, a method for generating new configuration data based on relationships between building objects is described. The method comprises providing a database storing relationships between a plurality of building objects representing building equipment and building spaces and providing a configuration tool. The configuration tool is configured to obtain configuration data associated with a first building object of the plurality of building objects and use the relationships between the plurality of building objects to identify a second building object having a stored relationship with the first building object. The configuration tool is also configured to automatically generate configuration data for the second building object based on the configuration data associated with the first building object and the relationship with the second building object.

In some embodiments, the first building object represents a building space of the building spaces and the second building object represents a piece of building equipment of the building equipment.

In some embodiments, the configuration data associated with the building space represents a configuration of each piece of building equipment that serves the building space.

In some embodiments, the relationships between the plurality of building objects represent connections between different pieces of building equipment that cooperate to perform a common function.

In some embodiments, the first building object is a space object representative of the building spaces and the second building object is an equipment object of the building equipment and the configuration tool is further configured to tag the space object with tags representing pieces of building equipment that serves the building space and identify a first equipment object associated with one piece of building equipment of the pieces of building equipment as the second building object. The configuration tool is further configured to generate configuration data for equipment objects representing the other pieces of building equipment associated with the building space based on the automatically generated configuration data associated with the first equipment object.

In some embodiments, the configuration tool is configured to obtain the configuration data based on a configuration schedule, wherein the configuration schedule is based on at least one of static pressure reset strategies, warm-up/cool-down strategies, heating schedules, cooling schedules, night setback strategies, discharge air temperature, demand ventilation, demand response, pressure dependent zoning, central plant optimization, model predictive/artificial intelligence control, heavy equipment delay, alarm suppression, global data shares, interlocks, multiple commands, and fire emergency strategies.

In some embodiments, the configuration tool is further configured to identify a space object representative of a building space based on the configuration schedule and wherein the first building object is representative of building equipment that serves the building space.

In another implementation, a building management system is described. The building management system comprises a database storing causal relationships between a plurality of building objects representing building equipment and building spaces and a controller. The controller is configured to obtain a value of a variable of interest associated with a piece of building equipment of the building equipment and determine if the value is at a target value. If the value is not at a target value, the controller determines if there is a new configuration for the piece of building equipment of the building equipment to drive the variable of interest to the target value. If there is not a new configuration, the controller identifies a second piece of building equipment of the building equipment that provides an input to the piece of building equipment based on a causal relationship of the causal relationships and automatically generates a new configuration for the second piece of building equipment based on configuration data associated with the piece of building equipment and the causal relationship to drive the variable of interest to the target value.

In some embodiments, the controller is further configured to identify causal relationships between the second piece of building equipment and a plurality of pieces of building equipment, each piece of building equipment of the plurality of pieces of building equipment servicing a space of the building spaces, and automatically generating the new configuration for the second piece of building equipment is based further on configurations of the plurality of pieces of building equipment.

In some embodiments, the causal relationships are relationships between building objects associated with pieces building equipment that provide inputs to other pieces of building equipment.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 6B is an illustration of a graphical user interface showing different states the occupancy schedule of FIG. 6A may have in the building object database, according to some embodiments.

FIG. 8A is an illustration of a graphical user interface showing how zone temperatures are shared between pieces of building equipment within a building object database, according to some embodiments.

DETAILED DESCRIPTION

Overview

Figure 1A:
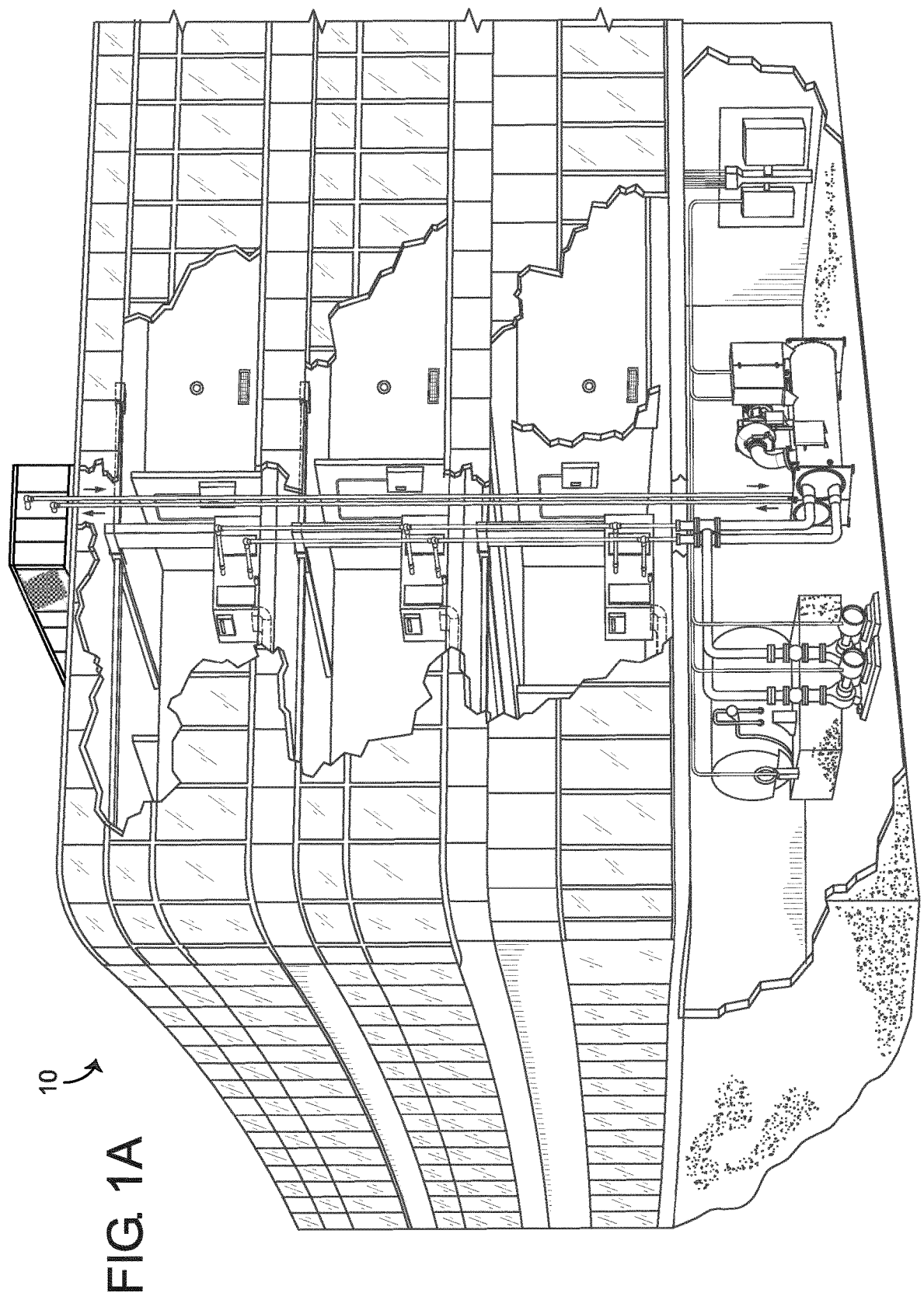
FIG. 1A is a perspective view of a building including a BMS, according to some embodiments.

Referring generally to the figures, a system and method for automatically generating configuration data for a building object is shown, according to various exemplary embodiments. A building management system may be able to receive and store building objects associated with building equipment and building spaces in a database. Building equipment may be a controller, fan, fan coil unit, VAV box, AHU unit, or any other type of device configured to operate buildings. In some embodiments, once the configuration tool identifies the building equipment as a building object, the configuration tool can identify other building objects that have a relationship with the building equipment by retrieving relationship data from the database. Once the other building objects have been identified, the configuration tool can identify new configuration data for each building object based on the building object's relationship to the first building object and the configuration of the first building object.

In some embodiments, the configuration tool can change configurations of the building objects by tagging the building objects with a configuration tag and selecting the configuration tag. If the configuration tool is changing the configuration of a first piece of building equipment using the building equipment's relationship to a second piece of building equipment within a database, the configuration tool can tag an equipment object associated with the first piece of building equipment with a configuration tag matching a configuration tag associated with the second piece building equipment after matching configuration tags between the two pieces of building equipment. The configuration tags can be matched using a table within the building management system that holds different mappings between configuration tags.

In some embodiments, a configuration tag of a first building object associated with a piece of building equipment can be determined based on a schedule. The schedule can be a user implemented configuration schedule that sets the configuration of different pieces of building equipment, such as setting time frames for when a VAV box is heating a room and when a VAV box is cooling a room. The building management system can select configuration tags for the building equipment based on the schedule.

In some embodiments, instead of using a schedule, the building management system can select configuration tags for the building equipment based on a mode of operation created by a user. The mode of operation may include configurations for a plurality of pieces of building equipment that operate to obtain a setpoint. The building management system can identify the mode of operation equipment is operating under and identify the configuration tag for each piece of building equipment that is associated with the mode of operation.

The configuration tool may include a space identifier. The space identifier may be able to receive inputs associated with different spaces around a building (e.g. a temperature reading or an air flow reading) received from sensors associated with the spaces. In some embodiments, the space identifier can identify spaces along with building equipment that can serve the spaces from a building object database.

The configuration tool may also include an equipment identifier that can identify equipment objects associated with space objects or with other equipment objects. In some embodiments, the equipment identifier can automatically identify the equipment objects associated with a space object identified by the space identifier from a building object database and identify different relationships the equipment has with other equipment and with the space in the building object database.

The configuration tool may also include a relationship identifier that can identify relationships between identified equipment objects and identified space objects from a relationship database. The relationship identifier can receive data from the equipment identifier and determine relationships the identified equipment has with other pieces of building equipment and relationships the equipment has with spaces. Relationships can indicate connections between different equipment objects representing pieces of equipment that serve a common space. In some embodiments, equipment objects can have a relationship with a space because the equipment objects serve the same space.

The configuration tool may also include a configuration identifier that can identify the configuration of the equipment identified by the equipment identifier. In some embodiments, the configuration tool can identify the configurations of equipment objects by identifying a selected configuration tag associated with a current configuration of a piece of building equipment. The configuration identifier can identify the configuration tag and determine a configuration of the building equipment by comparing the configuration tag to configurations in a database such as the building object database. The configuration identifier can also identify the relationship tag by identifying the configuration tag from a configuration schedule or a mode of operation.

The configuration tool may also include a new configuration generator that can generate new configuration data for a second piece of building equipment based on the configuration tag of the building object associated with the first piece of building equipment. For example, after the configuration identifier identifies a configuration tag associated with a first piece of building equipment, the new configuration generator can identify a second piece of building equipment associated with the first piece of building equipment by using the relationships the first piece of building equipment has with other pieces of building equipment within the relationship database. New configuration generator can then use a configuration tag of the first piece of building equipment to determine a new configuration for the second piece of building equipment.

Advantageously, the systems and methods described herein may be able to help speed up determining new configurations for a second piece of building equipment by automatically identifying a new configuration for the second piece of building equipment based on a selected configuration tag associated with a first piece of building equipment and a relationship between the two pieces of building equipment as stored within a relationship database. The building equipment and spaces can be converted into data objects within a database, tagged with configuration tags, assigned relationships with other equipment objects associated with building equipment that serves the same space, and automatically generate configuration data (and consequently configurations for the building objects) for the building objects with a relationship. In some embodiments, to generate the configurations, no other knowledge needs to be known about the area or equipment serving the area to change a piece of equipment's configuration other than configuration data of one building object associated with other building objects associated with equipment that serves the same area.

Generating New Configurations Based on Relationship Models for Building Objects

Embodiments of the present disclosure may include a computer system for a BMS (e.g., a BMS controller) that has been configured to help make differences in building subsystems transparent at the human-machine interface, application, or client interface level. The computer system may be configured to provide access to different building devices and building subsystems using common or unified building objects (e.g., software objects stored in memory) to provide the transparency. In an exemplary embodiment, a software defined building object (e.g., "virtual building object," "virtual device") groups multiple properties from disparate building systems and devices into a single software object that is stored in memory and provided by a computer system for interaction with other systems or applications (e.g., front-end applications, control applications, remote applications, client applications, local processes, etc.). Multiple software defined building objects may be described as forming an abstraction layer of a BMS software framework or architecture. Benefits such as allowing developers to write applications that will work regardless of a particular building subsystem makeup (e.g., particular naming conventions, particular protocols, etc.) may be provided by such software defined building objects. Such software defined building objects are further described in U.S. patent application Ser. No. 12/887,390, filed Sep. 21, 2010, which is hereby incorporated by reference in its entirety.

Referring now to FIG. 1A, a perspective view of a building 10 is shown, according to an exemplary embodiment. A BMS serves building 10. The BMS for building 10 may include any number or type of devices that serve the building. For example, each floor may include one or more security devices, video surveillance cameras, fire detectors, smoke detectors, lighting systems, HVAC systems, or other building systems or devices. In modern BMSs, BMS devices can exist on different networks within the building (e.g., one or more wireless networks, one or more wired networks, etc.) and yet serve the same building space or control loop. For example, BMS devices may be connected to different communications networks or field controllers even if the devices serve the same area (e.g., floor, conference room, building zone, tenant area, etc.) or purpose (e.g., security, ventilation, cooling, heating, etc.).

Figure 1B:
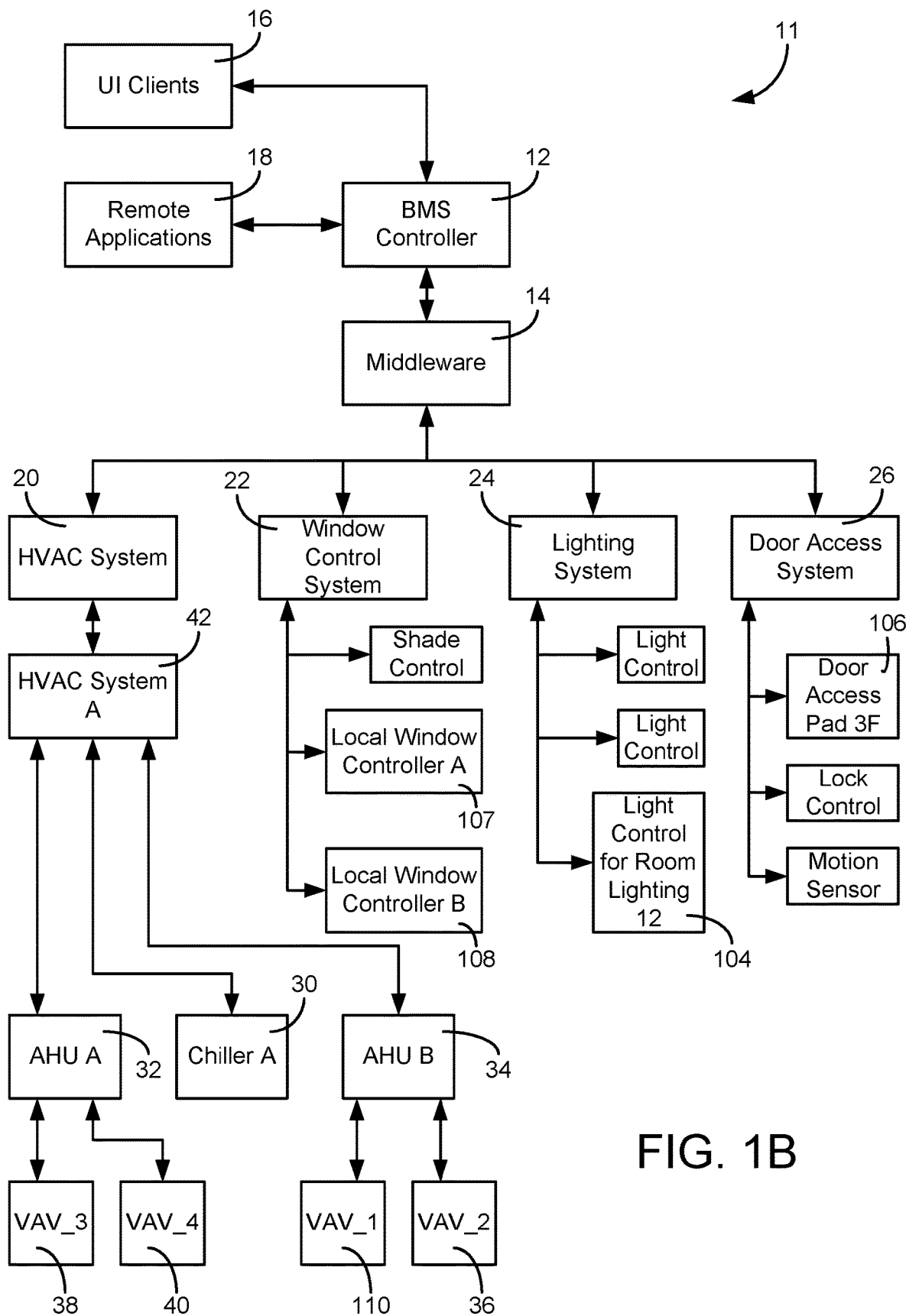
FIG. 1B is a block diagram of the BMS for the building of FIG. 1A, according to some embodiments.

Referring now to FIG. 1B, a block diagram of an exemplary BMS 11 for building 10 of FIG. 1A is shown, according to an exemplary embodiment. BMS 11 is shown to include a plurality of BMS subsystems 20-26. Each BMS subsystem 20-26 is connected to a plurality of BMS devices and makes data points for varying connected devices available to upstream BMS controller 12. Additionally, BMS subsystems 20-26 may encompass other lower-level subsystems. For example, an HVAC system may be broken down further as "HVAC system A," "HVAC system B," etc. In some buildings, multiple HVAC systems or subsystems may exist in parallel and may not be a part of the same HVAC system 20.

As illustrated in FIG. 1B, a BMS subsystem includes HVAC system 20. HVAC system 20 is shown to include a lower-level HVAC system 42, named "HVAC system A." For example, HVAC system 20 may control HVAC operations for a given building (e.g., building 10), while "HVAC system A" 42 controls HVAC operations for a specific floor of that building. "HVAC system A" 42 is connected to air handling units (AHUs) 32, 34, named "AHU A" and "AHU B" in the BMS, respectively. AHU 32 may control variable air volume (VAV) boxes 38, 40, named "VAV_3" and "VAV_4" in the BMS. Likewise, AHU 34 may control VAV boxes 36 and 110, named "VAV_2" and "VAV_1." HVAC system 42 may also include chiller 30, named "Chiller A" in the BMS. Chiller 30 may provide chilled fluid to AHU 32 and/or to AHU 34.

HVAC system 42 may also receive data from AHUs 32, 34 (e.g., a temperature setpoint, a damper position, temperature sensor readings). HVAC system 42 may then provide such BMS inputs up to HVAC system 20 and on to middleware 14 and BMS controller 12. Similarly, other BMS subsystems may receive inputs from other building devices or objects and provide them to middleware 14 and BMS controller 12 (e.g., via middleware 14). For example, a window control system 22 may receive shade control information from one or more shade controls, may receive ambient light level information from one or more light sensors, or may receive other BMS inputs (e.g., sensor information, setpoint information, current state information, etc.) from downstream devices. Window control system 22 may include window controllers 107, 108, named "local window controller A" and "local window controller B" in the BMS, respectively. Window controllers 107, 108 control the operation of subsets of the window control system 22. For example, window controller 108 may control window blind or shade operations for a given room, floor, or building in the BMS. Lighting system 24 may receive lighting related information from a plurality of downstream light controls, for example, from room lighting 104. Door access system 26 may receive lock control, motion, state, or other door related information from a plurality of downstream door controls. Door access system 26 is shown to include door access pad 106, named "Door Access Pad 3F" which may grant or deny access to a building space (e.g., floor, conference room, office, etc.) based on whether valid user credentials are scanned or entered (e.g., via a keypad, via a badge-scanning pad, etc.).

BMS subsystems 20-26 are shown as connected to BMS controller 12 via middleware 14 and are configured to provide BMS controller 12 with BMS inputs from the various BMS subsystems 20-26 and their varying downstream devices. BMS controller 12 is configured to make differences in building subsystems transparent at the human-machine interface or client interface level (e.g., for connected or hosted user interface (UI) clients 16, remote applications 18, etc.). BMS controller 12 is configured to describe or model different building devices and building subsystems using common or unified building objects (e.g., software objects stored in memory) to help provide the transparency. Benefits such as allowing developers to write applications that will work regardless of the building subsystem makeup may be provided by such software building objects.

Figure 1C:
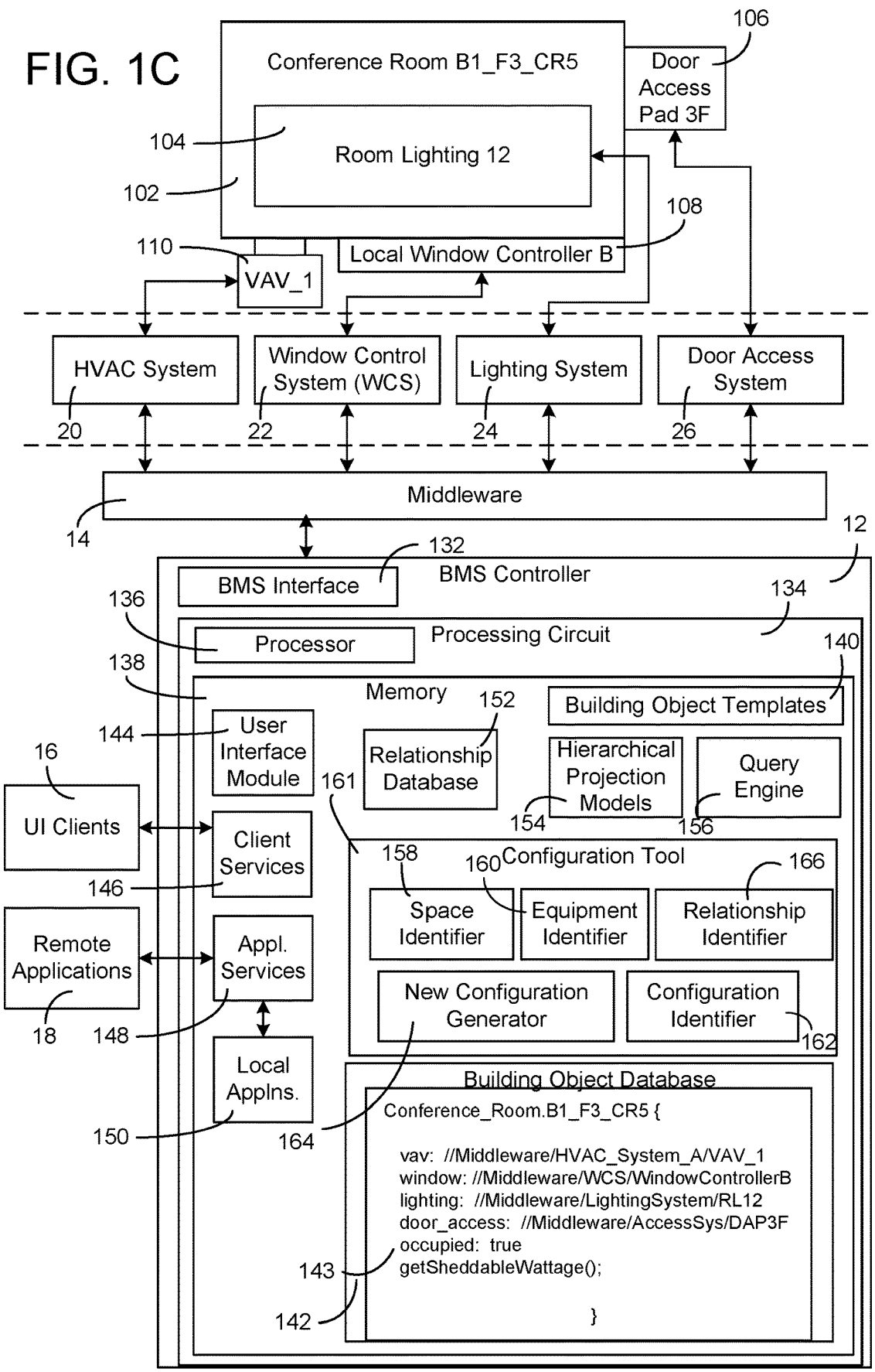
FIGS. 1C-D are detailed block diagrams of the BMS controller shown in FIG. 1B, according to some embodiments.
Figure 1D:
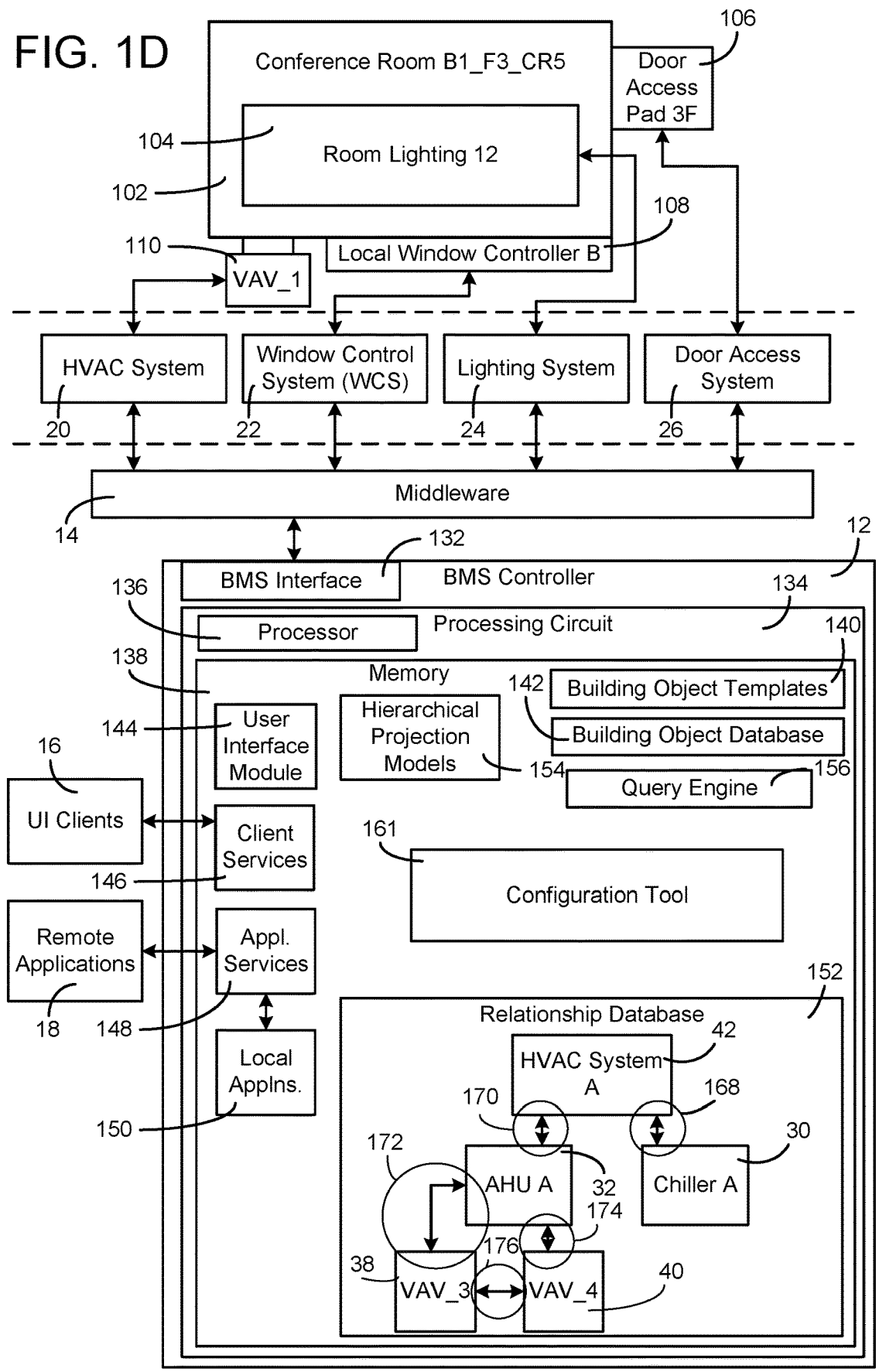

FIGS. 1C-D are detailed block diagrams of a portion of the BMS as shown in FIG. 1B, according to an exemplary embodiment. Many different building devices connected to many different BMS subsystems are shown to affect conference room "B1_F3_CR5." For example, conference room 102 includes or is otherwise affected by VAV box 110, window controller 108 (e.g., a blind controller), a system of lights 104 named "Room Lighting 12," and door access pad 106. As is viewable in FIGS. 1C-D and also in FIG. 1B, VAV box 110, window controller 108, lights 104, and door access pad 106 are not otherwise related. Each of the building devices shown at the top of FIGS. 1C-D may include local control circuitry configured to provide signals to their supervisory controllers or more generally to the BMS subsystems 20-26. The local control circuitry of the building devices shown at the top of FIGS. 1C-D may also be configured to receive and respond to control signals, commands, setpoints, or other data from their supervisory controllers. The local control circuitry of VAV box 110 may include circuitry that affects an actuator in response to control signals received from a field controller that is a part of HVAC system 20. Window controller 108 may include circuitry that affects windows or blinds in response to control signals received from a field controller that is part of window control system (WCS) 22. "Room Lighting 12" 104 may include circuitry that affects the lighting in response to control signals received from a field controller that is part of lighting system 24. Access pad 106 may include circuitry that affects door access (e.g., locking or unlocking the door) in response to control signals received from a field controller that is part of door access system 26.

In conventional buildings, the BMS subsystems are often managed separately. Even in BMSs where a unified graphical user interface is provided, a user must typically click through a hierarchy such as is shown in FIG. 1B to view data points for a lower level device or to make changes (e.g., setpoint adjustments, etc.). Such separate management can be particularly true if the subsystems are from different manufacturers or communicate according to different protocols. Conventional control software in such buildings is sometimes custom written to account for the particular differences in subsystems, protocols, and the like. Custom conversions and accompanying software is time consuming and expensive for end-users or their consultants to develop. A software defined building object of the present disclosure is intended to group otherwise ungrouped or unassociated devices so that the group may be addressed or handled by applications together and in a consistent manner.

In an exemplary BMS controller, a conference room building object may be created in memory for each conference room in the building. Further, each conference room building object may include the same attribute, property, and/or method names as those shown in FIGS. 1C-D. For example, each conference room may include a variable air volume box attribute, a window attribute, a lighting attribute, and a door access device attribute. Such an architecture and collection of building objects is intended to allow developers to create common code for use in buildings regardless of the type, protocol, or configuration of the underlying BMS subsystems. For example, a single automated control application may be developed to restrict ventilation to conference rooms when the conference rooms are not in use (e.g., when the occupied attribute is equal to "true"). Assuming proper middleware and communications systems, the setup or the installation of a different BMS device or an application for a different BMS may not need to involve a re-write of the application code. Instead, for example, if a new building area is designated as a conference room, a new conference room building object can be created and set-up (e.g., a variable air volume unit mapped to the conference room building object). Once a new conference room building object is created and set-up, code written for controlling or monitoring conference rooms can interact with the new conference room (and its actual BMS devices) without modification.

Referring still to FIGS. 1C-D, the BMS is shown to include a BMS interface 132 in communication with middleware 14 of the BMS. Middleware 14 is generally a set of services that allow interoperable communication to, from, or between disparate BMS subsystems 20-26 of the BMS (e.g., HVAC systems from different manufacturers, HVAC systems that communicate according to different protocols, security/fire systems, IT resources, door access systems, etc.). Middleware 14 may be, for example, an EnNet server sold by Johnson Controls, Inc. While middleware 14 is shown as separate from BMS controller 12, in various exemplary embodiments, middleware 14 and BMS controller 12 are integrated. For example, middleware 14 may be a part of BMS controller 12.

BMS interface 132 (e.g., a communications interface) can be or include wired or wireless interfaces (e.g., jacks, antennas, transmitters, receivers, transceivers, wire terminals, etc.) for conducting data communications with another system or network. For example, BMS interface 132 can include an Ethernet card and port for sending and receiving data via an Ethernet-based communications network. In another example, BMS interface 132 includes a WiFi transceiver for communicating via a wireless communications network. BMS interface 132 may be configured to communicate via local area networks or wide area networks (e.g., the Internet, a building WAN, etc.). BMS interface 132 is configured to receive building management inputs from middleware 14 or directly from one or more BMS subsystems 20-26. BMS interface 132 can include any number of software buffers, queues, listeners, filters, translators, or other communications-supporting services.

BMS controller 12 is further shown to include a processing circuit 134 including a processor 136 and a memory 138.

Processor 136 may be a general purpose or specific purpose processor, an application specific integrated circuit (ASIC), one or more field programmable gate arrays (FPGAs), a group of processing components, or other suitable processing components. Processor 136 is configured to execute computer code or instructions stored in memory 138 or received from other computer readable media (e.g., CDROM, network storage, a remote server, etc.). According to an exemplary embodiment, memory 138 is communicably connected to processor 136 via electronic circuitry. Memory 138 (e.g., memory unit, memory device, storage device, etc.) is one or more devices for storing data and/or computer code for completing and/or facilitating the various processes described in the present disclosure. Memory 138 may be RAM, hard drive storage, temporary storage, non-volatile memory, flash memory, optical memory, or any other suitable memory for storing software objects and/or computer instructions. Memory 138 may include database components, object code components, script components, or any other type of information structure for supporting the various activities and information structures described in the present disclosure. Memory 138, for example, includes computer code for executing (e.g., by processor 136) one or more processes described herein. When processor 136 executes instructions stored in memory 138 for completing the various activities described herein, processor 136 generally configures BMS controller 12 and more particularly processing circuit 134 to complete such activities.

Memory 138 is shown to include a building object database 142 and building object templates 140, which can be used to construct and store building objects of predefined types. For example, building object templates 140 may contain a "Conference Room" template that can be used to define conference room objects in building object database 142. Building object database 142 and building object templates can be used to construct both equipment objects and space objects associated with a building.

Building object database 142 may be a dynamic database that includes data associated with different building equipment objects, such as a VAV unit, and data associated with different building space objects, such as a conference room. Information in building object database 142 may be uploaded as building objects by building developers as a building is being completed, or updated by a building owner if new equipment or spaces have been added since the building was completed. For example, if a building developer is building an office building and plans to include an office space with a VAV unit used to control the temperature of the air in the office building, the building developer could code the VAV unit into building object database 142 as an equipment object and the conference room into building object database 142 as a space object. In some embodiments, the building developer may also include an AHU that is in communication with the VAV unit in building object database 142 along with the HVAC System that controls the relative AHU unit.

In another embodiment, for example, a building owner may build a new conference room in a pre-existing building. The building owner can update building object database 142 to include a new space object representing the conference room and also any equipment objects that can be used to control the environment of the conference room. In some embodiments, the equipment objects are tags for the space object as attributes as described herein. Building object database 142 may be able to hold any number of equipment objects and space objects and their corresponding attributes. Further, building object database 142 can include information about each building object describing each building object's purpose, which other building objects the building objects are in communication with, different functions each building object can perform, etc. Examples of different building objects that building object database 142 can hold are, but are not limited to, controllers, HVAC systems, AHUs, VAVs, window control systems, lighting systems, door access systems, chillers, lock control, motion sensor, door access pad, light switches, window controllers, shade controllers, and spaces in a building. In some embodiments, the systems and methods described herein are conducted via cloud computing. The controllers can be building objects within a building objects database of the cloud that can be configured to operate building equipment based on relationships of the controller to the building equipment within a relationship database of the cloud.

Space objects can be associated with any area within a building and outside of a building. For example, a space object may be associated with an entire conference room, or the space object may be associated with a portion of the conference room. Another example is a space object defining an area immediately outside of a building, such as on the roof. A space object defining an outside air temperature may be advantageous because some equipment objects, such as AHUs, boilers, and chillers, depend on the outside air to operate within a building they are associated with. These equipment objects depend on the outside air because they use the outside air (and in some cases the temperature of the outside air) to heat, cool, or provide air flow to areas within the building.

When input into building object database 142, space objects can be tagged with different attributes. In some embodiments, different attributes are equipment objects that have a relationship with the described area represented by the space object. For example, if a conference room is listed as a space object within building object database 142, each unit that acts to control (has a relationship with) the environment of the conference room can be listed as an attribute associated with the conference room within building object database 142. In some embodiments, the equipment objects can be used as hierarchical models associated with a space object as described below to be easily accessible to users accessing building object database 142. In some embodiments, each relationship between space objects and equipment objects can be represented as an object and stored in a relationship database 152.

Building object database 142 may be able to hold any number of objects as data describing equipment objects or space objects. Within building object database 142, each object can be organized into sections describing what type of object they are (i.e. VAV, chiller, boiler, area, etc.), their functions (i.e. cool a room, increase air flow in a room, boil water, etc.) or other characteristics. Further, the sections can be broken into further sections describing different types of objects and their specific models. In some embodiments, information in building object database 142 may be dynamic, so sections can be added, sections may be removed, information may be added, and information may be removed at any time.

An example of a software defined building object 143 named "Conference_Room.B1_F3_CR5" is illustrated as existing within building object database 142 in memory 138 of BMS controller 12. To create a particular building object (for example, a software object of an AHU), inputs from building management resources may be mapped (e.g., linked, associated, described, grouped) to attributes of the particular building object. A simplified exemplary result of such mapping might be an object such as:

```
Floor1AHU {
    temperature_sensor: Floor1AHU.controllerB.TempS;
    setpoint: Floor1AHU.345server.Setpoint;
    damper_position: Floor1AHU.345server.Damper;
}
```

The building object's name is "Floor1AHU" which may conform to a naming convention indicating that it is the AHU serving the first floor of a building. The building object "Floor1AHU" has three values or attributes: temperature sensor, setpoint, and damper_position that are mapped to the particular BMS resources of "Floor1AHU.controllerB.TempS," "Floor1AHU.345server.Setpoint," and "Floor1AHU.345server.Damper," respectively. The mapping provides a description for BMS or computing resources (e.g., back end software applications or client applications) so that the BMS or computing resources can identify, access, display, change, or otherwise interact with the particular BMS resources mapped to "Floor1 AHU" even when the resources are associated with different servers or controllers.

For example, BMS controller 12 may group inputs from the various subsystems 20-26 to create a building object "Conference_Room.B1_F3_CR5" including inputs from various systems controlling the environment in the room. An exemplary software defined building object might be an object such as:

```
Conference_Room.B1_F3_CR5 {
    vav: //Middleware/HVAC_System_A/VAV_1;
    window: //Middleware/WCS/WindowControllerB;
    lighting: //Middleware/LightingSystem/RL12;
    door_access: //Middleware/AccessSys/DAP3F;
    occupied: true;
    getSheddableWattage( );
}
```

The software defined building object's name is "Conference_Room.B1_F3_CR5" which may conform to a naming convention indicating that it is a conference room in a particular location in the building, e.g. Conference Room 5 is on Floor 3 of Building 1. The building object "Conference_Room.B1_F3_CR5" has several values or attributes including vav, window, lighting, door_access, occupied, and getSheddableWattage. The attributes of vav, window, lighting, and door_access are mapped to the particular BMS resources of "HVAC_System_A/VAV_1," "WCS/WindowControllerB," "LightingSystem/RL12," and "AccessSys/DAP3F," respectively.

The mapping describes relationships between equipment objects and space objects that they service and provides a description for BMS or computing resources (e.g., back end software applications, client applications, BMS control routines, etc.) so that the BMS or other computing resources can identify, access, display, change or otherwise interact with the software defined building object in a meaningful way (e.g., in a way that allows changes to be made to the mapped devices). A software defined building object may be mapped to BMS inputs manually. For example, the mapping may be completed by a user with a graphical user interface tool that requires a user to either type in or "drag and drop" BMS inputs to an object. Software defined building objects may also or alternatively be mapped to BMS inputs by computerized systems configured to provide varying degrees of mapping automation. For example, patent application Ser. No. 12/887,390, filed Sep. 21, 2010 as incorporated herein by reference in its entirety, describes systems and methods for creating software defined building objects and mapping BMS inputs to the building objects. "Occupied" is a boolean property unique to the "Conference_Room.B1_F3_CR5" building object. GetSheddableWattage( ) is a method unique to the "Conference_Room.B1_F3_CR5" building object.

As an example of how a building object may be used by the system, all conference room building objects may have the same attributes as "Conference_Room.B1_F3_CR5" listed above. Once each of the conference rooms in building 10 are mapped to a software defined conference room building object, the rooms may be treated the same way in code existing in BMS controller 12, remote applications 18, or UI clients 16. Accordingly, an engineer writing software code for UI clients 16, remote applications 18 or BMS controller 12 can know that each conference room will have attributes listed above (e.g., VAV, window, lighting, door access, occupied, getSheddableWattage( )). Therefore, for example, rather than having to know an address for a particular variable air volume controller in a particular HVAC system, a given conference room's VAV controller may be available at the conference room's VAV attribute.

The creation of a software defined building object may include three steps:

1. defining a building object template;
2. creating an instance of a building object based on the template; and
3. mapping or binding building object properties or attributes to particular BMS devices or inputs.

As an example of the first step, a conference room template or class may be created (e.g., by a developer, by a rapid application development module, etc.) such as the following:

```
public class Conference_Room extends Device {
    def vav
    def window
    def lighting
    def door_access
    def occupied
    def getSheddableWattage( ) { ... }
}
```

In some embodiments, the building object template or class may be a Groovy/Java class configured to inherit a series of benefits such as the ability to extend existing devices.

An instance of the class may be created and named (for example "B1_F3_CR5"). The names can be descriptive, based on an automated routine configured to find building objects, manually applied, or otherwise.

The mapping or binding process maps disparate BMS devices or inputs to the instance of the building object.

Once the building objects are created and BMS devices or inputs are mapped to the building objects, software defined building objects may be used by applications (local, remote, client, etc.) with any suitable programming language or syntax. As an example of interaction with the software defined building object used in previous examples, the following exemplary piece of code is configured to load "B1_F3_CR5" as ConfRoom, print the result of the method getSheddableWattage for ConfRoom, and set the window parameter to "50" (which may be sent to WCS 22 or "Local Window Controller B" 108 via BMS interface 132 or middleware 14 shown in FIGS. 1C-D to cause the blinds to be 50 percent open) when the ConfRoom object is saved.

```
def ConfRoom=factory.load
    ("Conference_Room.B1_F3_CR5")
println ConfRoom.getSheddableWattage( );
ConfRoom1.window=50
factory.save(ConfRoom)
```

In some embodiments, when a user inputs a piece of building equipment related to a space or piece of building equipment into building object database 142, the user can tag the building object with attributes indicating each and every possible configuration the piece of building equipment can operate under, each space the building object can serve, and each piece of building equipment that operates to effect the same space or spaces, or the piece of building equipment has a relationship with. For example, if the user inputs a fan that serves a break room space into building object database 142, the user can manually tag the fan with tags describing each configuration the fan can operate under (i.e. variable speed, constant speed, heating, cooling, high air flow, low air flow, etc.), areas of the breakroom and areas immediately surrounding the breakroom that the fan can impact, and other pieces of building equipment the fan may have a relationship with. When a piece of building equipment associated with a building object is operating, a tag associated with the configuration of the building equipment may appear as being selected with building object database 142.

Pieces of building equipment can have a direct equipment relationship with other pieces of building equipment or an indirect relationship with other pieces of building equipment within building object database 142. For example, if a fan coil unit is controlled by a VAV box to cool an office space and is the building object that is being added to building object database 142, the user adding the fan can tag the fan coil unit with an equipment relationship tag indicating that the fan coil unit is controlled by the VAV box, The VAV box has a direct relationship with the fan. If other fans are operating to cool the same office space, the user can also tag the fan with an indirect building object relationship tag indicating the other fans that are operating to cool the space object within building object database 142. Each fan that is cooling the office space can be similarly tagged. Further, each relationship tag between pieces of building equipment can be stored in relationship database 152.

In some embodiments, BMS controller 12 can automatically tag pieces of building equipment and spaces after a user has input them into building object database 142 with tags indicating different attributes. To do so, BMS controller 12 can scan the inputs by looking for characteristics of the equipment or space and comparing each characteristic to characteristics within a database such as building object database 142. If BMS controller 12 can match enough characteristics between the input object and an object within the database, BMS controller 12 can identify the type of equipment or space the user added to the database and its function. For example, a user can input a fan as a building object into building object database 142. BMS controller 12 can scan the input looking for attributes that are similar to attributes in the database, such as the name of the fan or the current that is generated when sending a test signal through the fan. If BMS controller 12 can find enough matches to reach a user selected threshold (i.e. if the user sets string match value to 8 characters or a current match value to 2 mA), BMS controller 12 can automatically determine which type of building equipment has been added to the network or was already attached to a network that BMS controller 12 was attached to. Automatically determining what type of building pieces are being added to the system can be beneficial if a user is implementing the automatic relationship model into an old system and is looking to save time by not having to manually connect each building object to BMS controller 12.

Relationship database 152 may be one component or a plurality of components and is not meant to be limited by this disclosure. Relationship database 152 may be a dynamic database that includes data associated with relationships between different building objects. In some embodiments, relationships in relationship database 152 may include relationships between two equipment objects, an equipment object and a space object, and two space objects. Each relationship may be direct or indirect as described above. Users may add relationships to relationship database 152 either directly, by coding the relationships into relationship database 152 via a user interface, or indirectly by tagging different building objects with relationship tags. Once a user tags building objects with relationship tags identifying each building object's relationship with each other, BMS controller 12 can automatically add the relationship to relationship database 152. In some embodiments, BMS controller 12 can add the relationships to relationship database 152 in addition to building object database 142 so a user can view and change the relationships when viewing either database via a user interface.

In some embodiments, relationships between different equipment objects can be associated, or tagged, with configurations for each equipment object in the relationship and each building object's relationship with an attribute of a space object, such as the space object's temperature. For example, a fan coil unit can cooperate with a VAV box to cool or heat a conference room. In this example, the fan coil unit and the VAV box are equipment objects associated by a relationship and the conference room is the space object they are associated with. To operate, the fan coil unit can operate in conjunction with the VAV box which can control the air that is flowing out of the fan into the conference room, so the fan coil unit and the VAV box can be tagged with a relationship tag indicating the two can work together (i.e. have corresponding configurations to reach a collective result) instead of operating against each other. In some embodiments, fan coil units that provide heat and cooling to the same space can be tagged with relationship tags to ensure they do not operate against each other.

In some embodiments, relationship tags stored in relationship database 152 can be attached to space objects and can be used to easily identify configurations for multiple equipment objects that operate to serve the space object. Continuing with the conference room example above, a space object representing a conference room can be tagged with relationships between the conference room and different equipment objects that are used to cool and heat the conference room. Each relationship is stored within relationship database 152. Each relationship between the conference room and the equipment objects can be tagged with different configurations that can be used to obtain a result, such as heating or cooling the room.

In some embodiments, configurations between different building objects can be associated, or tagged, with a user created mode of operation. For example, if a user looks to cool a conference room, the user can create a mode of operation where each building object that has a relationship with the conference room can have a configuration when cooling the conference room. The building objects can further use relationships between equipment objects to ensure none of the building objects are working against each other (such as a VAV box working to heat the conference room while a fan coil unit is working to cool the conference room, or one VAV box that is working to heat a conference and another VAV box that is working to cool the conference room). Consequently, to cool the conference room, the user (or BMS controller 12 if the process is done based on a defined schedule or after receiving an input) can select a mode of operation, and BMS controller 12 can automatically change each equipment object's configuration based on the tagged configurations of the tagged relationships between equipment objects.

An advantage to using tagging to perform an operation, such as cooling the conference room, using different modes of operation is BMS controller 12 may operate only knowing the configuration of fan coil units that serve the conference room and the fan coil units' relationships with other building objects, such as VAV boxes. Once BMS controller 12 knows these configurations and their relationships, BMS controller 12 can use the configurations of the fan coil units to determine what the configurations of each VAV box should be, maximizing the efficiency of each piece of building equipment if a user suddenly changes the selected mode of operation (to heating for example) and minimizing the manual work that may generally be needed to operate a building and ensuring each piece of building equipment is operating in conjunction with each other. In some embodiments, the VAV boxes can have relationships with AHUs and AHUs can have relationships with other devices in an HVAC system. Each of these pieces of building equipment can be represented by equipment objects in building object database 142 and the relationships can be stored in relationship database 152. BMS controller 12 can use each of these relationships and configuration tags associated with each relationship to automatically determine configurations for each equipment object.

In some embodiments, a user, such as a technician, implementing automatic control based on object relationships into a building can create different configuration schedules for each building object depending on the needs of a building owner. For example, an owner may wish to keep a building cool during the day when people are likely to occupy the space but warmer at night to avoid spending money on electricity to cool an empty building. The owner can identify a configuration for a few pieces of building equipment that serve the room and then automatically identify configurations for other pieces of building equipment using the configurations of the few pieces of building equipment and their relationship. In some implementations, a sensor can be used to detect when a building or space is occupied, so BMS controller 12 can determine building object configurations based on the sensor's readings.

BMS controller 12 can utilize configuration tool 161 and its respective components to control and change the configurations of each piece of building equipment that is related to the relevant configuration schedule. BMS controller 12 can use user selected modes of operation to operate the schedule. For example, a user may create a mode of operation for cooling a building and another mode of operation for heating a building. The user may also implement a schedule where a building is cooled in the evening and heated during the day. BMS controller 12 can use an internal clock with the schedule to implement the heating mode of operation during the day and the cooling operation during the evening. When implementing each mode of operation, BMS controller 12 can scan building object database 142 and relationship database 152 for building objects and relationships that have been tagged with the corresponding mode of operation tag and configuration tags defining how each building object should be configured under each mode of operation.

Different configuration schedules can include, but are not limited to, schedules based on the occupancy of the building, schedules based on static pressure reset strategies, warm-up/cool-down strategies, heating schedules, cooling schedules, night setback strategies, discharge air temperature, demand ventilation, demand response, pressure dependent zoning, central plant optimization, model predictive/artificial intelligence control, heavy equipment delay, alarm suppression, global data shares, interlocks, multiple commands, and fire emergency strategies. Each configuration schedule may be located in relationship database 152 or another database within BMS controller 12. Further, each schedule may be manually created by a technician based on the needs of the building that BMS controller 12 is operating in.

Once a user has created a schedule input to determine different configurations for building equipment and their associated equipment objects over time, BMS controller 12 can receive the schedule and automatically generate configuration data for each building object using each building object's relationships with each other. BMS controller 12 can use the generated configuration data to change the configuration of the building equipment associated with the building object that receives the new configuration data.

To automatically change the configurations of pieces of building equipment, BMS controller 12 includes configuration tool 161. Configuration tool 161 may be one or a plurality of components within BMS controller 12 configured to obtain configuration data associated with different building objects and generate new configuration data for building objects using relationships stored in relationship database 152. Configuration tool 161 is shown to include a space identifier 158, an equipment identifier 160, a relationship identifier 166, a configuration identifier 162, and a new configuration generator 164.

Space identifier 158 may be one component or a plurality of components used to identify different spaces in a building and the space objects associated with the spaces and is not meant to be limited by this disclosure. Space identifier 158 can operate by scanning a schedule created by a user and determining which areas of a building the schedule is meant to operate in. In some embodiments, a user may have explicitly labelled areas within the building as target areas to be effected by the pieces of building equipment. Space identifier 158 can identify these target areas as spaces and then identify the space objects in building object database 142 associated with the spaces. When identifying the space objects, space identifier 158 can also identify each attribute associated with the space, such as which equipment objects are tagged as attributes to the space and different characteristics of the space (such as the temperature, pressure, air flow, etc.). After identifying the spaces and the tagged equipment objects, space identifier 158 can send a signal to equipment identifier 160 indicating that the spaces have been identified and which equipment objects are associated with the space and the different characteristics.

In some embodiments, instead of relying on receiving a schedule input to identify spaces, space identifier 158 can continuously monitor spaces within a building by receiving inputs from sensors around the building that sense different attributes for each space, such as a thermometer keeping track of the temperature within a room. In some embodiments, space identifier 158 may implement a different threshold for each attribute, so if a value associated with an attribute falls below or rises above a user selected threshold (depending on the attribute), space identifier 158 can send a signal to equipment identifier 160 indicating that equipment objects tagged as attributes with the space need to change configurations to bring the value back below (or above) the user selected threshold. For example, a user may have determined that the temperature in a conference room may not go above 75 degrees. Space identifier 158 may receive a value from a thermometer indicating that the temperature in the conference room is 78 degrees. Space identifier 158 can determine that this value is above the threshold, identify equipment objects associated building equipment associated with the temperature of the conference room, and send a signal to equipment identifier 160 indicating that the identified equipment objects should change configurations to bring the temperature below the 75 degree threshold.

Equipment identifier 160 may be one component or a plurality of components configured to identify equipment objects associated with the spaces identified by space identifier 158. Equipment identifier 160 can receive the tagged space object and the equipment identified by space identifier 158 and identify the equipment in building object database 142. Equipment identifier 160 may also identify each possible configuration in which the equipment associated with the equipment objects can operate and the different relationships the equipment objects have been tagged with. For example, space identifier 158 may send a list of equipment that is related to a conference room associated with a space object. Equipment identifier 160 can receive this list and identify equipment objects associated with each piece of equipment on the list and the relationships associated with each equipment object.

In some embodiments, equipment identifier 160 can also identify different configurations for each piece of building equipment from building object database 142. The configurations may be associated with bringing an input value from a sensor, such as a thermometer, below or above a user selected threshold. For example, equipment identifier 160 may receive a signal from space identifier 158 indicating that the equipment associated with a conference room needs to change configurations to bring a temperature in the conference room below a 75 degree threshold. Equipment identifier 160 can identify tagged configurations for the identified equipment used to cool the conference room. Once the configurations have been identified, a signal can be sent to relationship identifier 166 including the identified configurations and equipment objects associated with the building equipment.

In some embodiments, equipment identifier 160 may only identify one equipment object of the plurality of equipment objects related to a space object sent from space identifier 158. Further, in some instances, space identifier 158 may only send equipment identifier 160 one identified equipment object, regardless of the number of identified equipment objects associated with a space object or its attributes. In both instances, equipment identifier 160 can identify different relationships the identified equipment object has with other equipment objects by identifying relationship tags on the identified equipment object. Equipment identifier 160 can use these relationship tags to determine other equipment objects that may be associated with the space object. For example, space identifier 158 may only send equipment identifier 160 one identified equipment object related to a fan that controls air flow in a conference room when multiple fans act in conjunction with each other and other VAV boxes to control the air flow. Equipment identifier 160 can identify each of the other equipment objects associated with the equipment that control air flow in the conference room by scanning the fan for tags indicating the fan has a relationship with a set of equipment objects, identifying equipment objects with a relationship with the set of equipment objects, scanning the identified equipment objects for further relationships, identifying the equipment objects with the further relationships, and continuing this process until each equipment object associated with each piece of building equipment that controls the airflow in the conference room is identified. In some embodiments, the relationships can be identified by relationship identifier 166 and then equipment identifier 160 can identify second pieces of equipment based on the identified relationships.

Relationship identifier 166 can be one component or a plurality of components configured to identify relationships between equipment objects from relationship database 152 after receiving a signal from equipment identifier 160 identifying each equipment object. In some embodiments, the relationships can represent different configuration data associated with equipment objects based on an input schedule. For example, an input schedule may indicate that a conference room needs to be cooled at a certain time and then warmed at a certain time. Space identifier 158 can identify each space object that is associated with the conference room from building object database 142, equipment identifier 160 can then identify each equipment object that contributes to the heating and cooling attributes of the conference room, and relationship identifier 166 can identify the relationships of each equipment object based on their relationship with each other and input schedule. After identifying the configuration data associated with each building object, relationship identifier 166 can send the configuration data to configuration identifier 162.

Configuration identifier 162 may be one component or a plurality of components within configuration tool 161 that can receive the configuration data from relationship identifier 166 and determine the current configurations of each piece of building equipment associated with equipment objects identified by equipment identifier 160. Configuration identifier 162 can identify the configuration of different pieces of building equipment by scanning the equipment objects associated with the building equipment for a selected configuration tag. A configuration tag may be manually selected by a user or technician or set by a configuration schedule it is associated with. For example, if a configuration schedule calls for a VAV box to cool a room, BMS controller 12 may automatically select a configuration for the VAV box that cools the room.

In some embodiments, configuration identifier 162 can identify configurations of different pieces of building equipment by providing a test signal with a low amplitude to each piece of building equipment and observing the output (e.g. comparing the output to the input). Configuration identifier 162 can compare the output/input comparison to output/input comparisons within building object database 142 or another database within BMS controller 12 to determine the configuration of the pieces of building equipment. Once configuration identifier 162 determines the configuration, configuration identifier 162 can tag building objects associated with the building equipment with configuration tags.

In some embodiments, configuration identifier 162 can identify the configurations of one equipment object and then identify a second equipment object that has a relationship with the first equipment object. Configuration identifier 162 can identify each configuration automatically by identifying a selected configuration tag for each piece of building equipment or after providing the low amplitude test signal to the building equipment associated with the equipment objects.

New configuration generator 164 may be one component or a plurality of components within configuration tool 161 that can receive configuration data from configuration identifier 162 and generate new configuration data associated with equipment objects based on each equipment object's relationship with each other. In some embodiments, new configuration generator 164 can generate configuration data by matching a configuration tag of a first equipment object with a configuration tag of a second equipment object that has a relationship with the first equipment object.

In some embodiments, configuration tags are considered to be a match when they are designed for the same purpose (e.g. to heat a room, heat water, cool water, control air flow, etc.). Configuration tags can be stored in a table within a database in BMS controller 12 showing configuration tags that are matched with each other. New configuration generator 164 can determine new configuration data for a second building object associated with a piece of building identifying the configuration tag associated with a first building object and identifying a match with a second building object representing the building equipment BMS controller 12 is generating a new configuration for.

In some embodiments, to generate a new configuration for an equipment object, new configuration generator 164 can identify the configuration tag on a first equipment object, identify each relationship the first equipment object has with other equipment objects, identify configuration tags for each of the other equipment objects that match the configuration of the first equipment object within building object database 142, and generate configuration data for each of the other equipment objects based on the matched tags.

In some embodiments, the configuration tags of equipment objects with a relationship may be associated with a configuration schedule. For example, a configuration schedule may specify that a VAV box cool a room. Consequently, a cooling configuration tag can be selected and associated with the VAV box and the VAV box's equipment object. New configuration generator 164 can identify relationships that the equipment object associated with the VAV box has with other equipment objects associated with cooling the room, such as an AHU, and select a configuration tag associated with cooling the room for each of the other equipment objects based on their relationship with the VAV box. Once new configuration generator has selected a new configuration tag for the building object, BMS controller 12 can send a signal to the associated building equipment with new configuration information.

In an exemplary embodiment, application services 148 of BMS controller 12, shown and described in reference to FIG. 1C, may be or include web services configured to allow remote applications 18 or local applications 150 to access building object templates 140, building object database 142, a relationship database 152, hierarchical projection models 154 and a query engine 156 directly or indirectly via a set of internet application programming interfaces. To support such interfaces, each software defined building object may include or be exposed to a toXML( ) method configured to describe the software defined building object using XML. In another exemplary embodiment, application services 148 allows remote applications 18 on other BMS controllers to communicate with BMS controller 12 over a network.

Memory 138 is also shown to include hierarchical projection models 154. While the models of the present disclosure are not stored or represented as static hierarchical models, systems and methods of the present disclosure are configured to allow the creation of multiple hierarchical views of each relationship model. Each "view" may be defined as a hierarchical model (e.g., tree model, unidirectional tree, top-down tree having a head node) in memory 138 to which a relationship model can be applied. In other words, one or more hierarchical models may be created in memory 138 and one or more relationships can be projected onto the one or more hierarchical models. For example, a hierarchical model may show that an AHU is related to a VAV which is related to a conference room. Each object may be related to more than one object.

Memory 138 also includes client services 146 configured to allow interaction between internal or external clients or applications and BMS controller 12. Client services 146, for example, may include web services or application programming interfaces available for communication by UI clients 16 and remote applications 18 (e.g., an energy monitoring application, an application allowing a user to monitor the performance of the BMS, an automated fault detection and diagnostics system, etc.).

Memory 138 is further shown to include user interface module 144. User interface module 144 is configured to generate one or more user interfaces for receiving inputs from a user. User interface module 144 may be configured to provide, for example, a graphical user interface, a voice driven interface, a text-based interface, or another interface for receiving user input regarding the mapping of BMS inputs to building objects. In an exemplary embodiment, user interface module 144 is an HTML-based application configured to be served by, for example, client services 146 or another web server of BMS controller 12 or another device. User interface module 144 may be configured to prompt a user (e.g., visually, graphically, audibly, etc.) for input regarding building object database 142, building object templates 140, relationship database 152 or hierarchical projection models 154. In an exemplary embodiment, user interface module 144 prompts the user to create (or otherwise provides a user interface for creating) a template building object 140. User interface module 144 may also prompt the user to map BMS inputs to the template building object. User interface module 144 may receive and handle the user inputs to initiate the storage of received input mappings. In another exemplary embodiment, user interface module 144 may prompt the user to identify, define, store, modify or delete a relationship in relationship database 152. For example, a user may use a GUI to create a relationship between defined building objects in building object database 142, e.g. relating a conference room object to a VAV box object. User interface module 144 may further be configured to generate and serve graphical user interfaces having information displays of building objects and/or relationships. User interface module 144 may also be configured to utilize query engine 156 to query and retrieve information about relationships in relationship database 152 or via hierarchical projection models 154.

In FIG. 1D, relationship database 152 is shown to include relationship models between each of building objects HVAC System A 42, AHU A 32, Chiller A 30, VAV_3 38, and VAV_4 40. HVAC System A 42 may be related to AHU A 32 through relationship 170, HVAC System A 42 may be related to Chiller A 30 through relationship 168, AHU A 32 may be related to VAV_3 38 through a relationship 172, and AHU A 32 may be related to VAV_4 40 through relationship 174. VAV_3 38 may also be related to VAV_4 40 through relationship 176. Relationships 168-176 can represent connections between each building objects. Relationships 168-

174 can also represent connections where configuration tool 161 can change the configuration of one building object based on the building object's relationship with another building object. The relationship models and their respective objects can be associated with a specific room or space within a building, such as a conference room (i.e. conference room 102). For example, VAV_3 38 is shown linked to AHU A with a relationship 172. This link represents the relationship between VAV_3 38 and AHU A 32. VAV box 110 is affected by HVAC System 20 and so the corresponding relationship is shown as being directional from conference room 102 to VAV box 110. Similarly, room lighting 104 lights conference room 102, window controller 108 dims conference room 102, and access pad 106 controls access to conference room 102. As described above, conference room 102 is not a building device that is associated with any one particular controller or BMS subsystem. As a complement to the software defined building object for the conference room, the exemplary relationship information structure shown at the bottom of FIG. 1D provides a multi-level relationship map that more clearly represents the complex control environment of the actual conference room shown at the top of FIG. 1D. In addition to more coding and software development advantages, the relationship models can provide new user interface views, more robust searching "show me all the fans and VAV boxes that operate to keep conference room D cool," new fault detection and diagnostics tools, and other advantages.

Relationships of relationship database 152 can include any number of relationships. Examples of relationships within relationship database 152 include, but are not limited to, contains, equipmentIsFedBy, equipmentIsServedBy, equipmentModulesOrUses, feeds, feedsEquipment, feedsSpace, hasAppHostedBy, hasCommunicationTag, hasControlFunction, hasControlTag, hasInput, hasItemTag, hasLocationTag, hasMediaTag, hasOtherTag, hasOutput, hasPart, hasPoint, hasStandardDescription, hasStandardTag, hostsAppFor, isAssociatedToPoint, isAssociatedWith, isAssociatedWithSubstance, isControlfunctionOf, isFedBy, isInputOf, isLocatedIn, isOutputOf, isPartOf, isPointOf, isServedBy, isUsedorModulatedByEquipment, measuresPropertyOfSubstance, pointIsAssociatedWith, serves, servesEquipment, servesSpace, similarModelClass, spaceIsFedBy, spaceIsServedBy, substanceIsAssociatedTo, and substancePropertyIsMeasuredBy.

Conventional building systems do not include organizational models which link and control the configurations of building objects based on their relationships. Instead, building systems typically employ control system logic and optimizations that are complicated to program and implement. Because these control systems are difficult to implement, building contractors may refrain from including logic and optimizations in a constructed building, relying instead on technicians to manually create configuration schedules within a controller for each piece of building equipment. Further, any attempt to implement new logic and optimization methods once a building has been completed can be difficult and expensive to implement because each piece of building equipment needs to be reconfigured separately without any preexisting relationship with other pieces of building equipment or a shared common plan.

A key feature of the automatic system logic based on the relationships model is the ability to quickly and automatically define relationships between dissimilar object types across a broad selection of different pieces of building equipment. A technician implementing another optimization model would typically need to manually connect each piece of building equipment together. The proposed solution would remove this step because once a BMS controller applying the relationship model is connected to a building's system, the BMS controller can automatically identify and generate new configurations for each building object within a database and program the building object to change configurations based on a room schedule selected by a technician.

Further, the model can cause the controller to automatically change the configuration of each piece of building equipment based on the configurations of other pieces of building equipment within the same building and further based on each piece of building equipment's relationship with each other and the areas of the building they serve. Because each piece of building equipment is configured to operate with each other, there is less of a risk that they will operate against each other. For example, if two fan coil units are configured to serve one space, normally the fan coil units would be separate entities and could work exclusive of each other. In some instances, the fan coil units could work against each other by operating in different modes (i.e. one fan coil unit operates to heat a room and the other fan coil unit operates to cool a room). Using the exemplary embodiment of the relationship model via a controller, however, the fans can be automatically linked together and the controller can control each fan's configuration using their relationship with each other to ensure the fans cooperate with each other to reach a desired result, such as cooling a room.

Figure 1E:
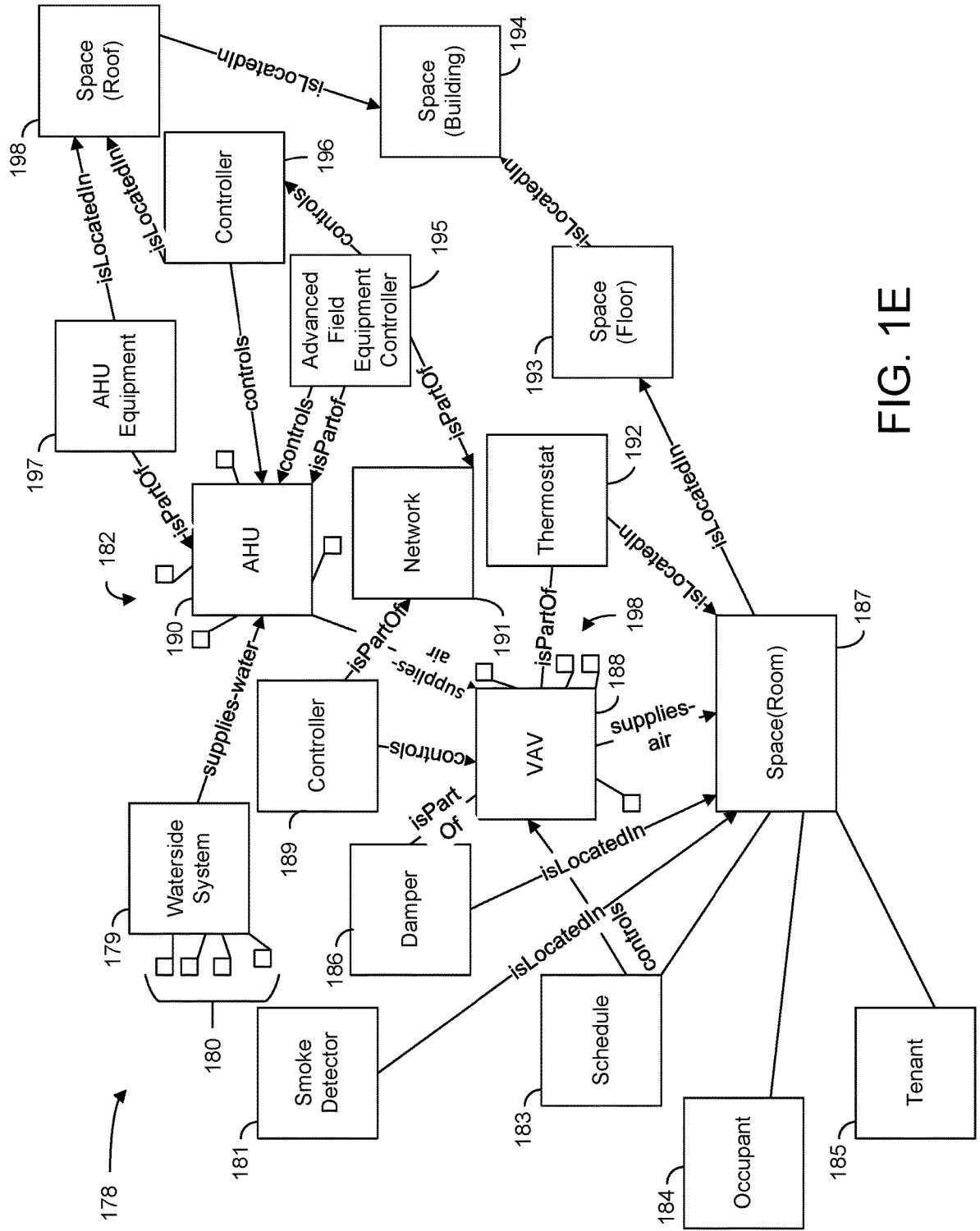
FIG. 1E is a block diagram of devices in a building management system including relationships between the different devices, according to some embodiments.

Referring now to FIG. 1E, a block diagram of devices in a building management system 178 including relationships between the different devices is shown, according to some embodiments. Building management system is shown to include a waterside system 179, a smoke detector 181, a schedule 183, an occupant 184, a tenant 185, a damper 186, a space 187, a VAV 188, a controller 189, an AHU 190, a network 191, a thermostat 192, a space 193, a space 194, an advanced field equipment controller 195, a controller 196, AHU equipment 197, and a space 198. Components 179, 181, 183, 186, 188-192, and 195-197 are shown to have relationships with each other to operate together and service space 187, in some embodiments. The relationships are represented by the descriptions in the lines connecting the components. Each relationship can be stored in relationship database 152. Further, the relationships are examples of relationships between the components and can be any relationship. Occupant 184 can be a person occupant of space 187 and tenant 185 can be a company tenant that inhabits the space 187.

Waterside system 179 is shown to supply water to AHU 190. AHU 190 is shown to supply air to VAV 188. AHU equipment 197 is shown to be a part of AHU 190 and be located in space 198. AHU equipment 197 may include various components of AHU 190 including, but not limited to, filters, heating and cooling elements, humidifiers, mixing chambers, fans, controls, and vibration isolators. VAV 188 is shown to include damper 186 and thermostat 192. Thermostat 192 is shown to be located in space 187. Controller 189 controls VAV 188 and is a part of network 191. Advanced field equipment controller 195 is shown to be a part of network 191 and AHU 190. Advanced field equipment controller 195 is also shown to be a supervisory controller for controller 196. Controller 196 is shown to control AHU 190 and be located in space 198. Schedule 183 is shown to control VAV 188 and other components of space 187. Smoke detector 181 is shown to be located in space 187. Space 187 can be a room and is shown to be located in space 193. Space 193 can be a floor and is shown to be located in space 194.

Space 194 can be a building. Space 198 can be a roof and is shown to be located in space 194.

Waterside system 179 is shown to include points 180. Points 180 can represent different aspects of a room controlled by waterside system 179, such as, but not limited to, the temperature, airflow, and setting of controllers and building equipment configurations. In some embodiments, waterside system 179 has four points, one point associated with airflow and configurations of different fans, two points associated with a temperature controlled by waterside system 179, and a point representing the configurations of different pieces of building equipment within waterside system 179.

Similarly, AHU 190 is shown to include points 182. Points 182 can represent different aspects of a room controlled by AHU 190. In some embodiments, AHU 190 has four points, one point associated with airflow and configurations of different fans, two points associated with the temperature controller by AHU 190, and one point associated with the configurations of equipment within AHU 190.

Similarly, VAV 188 is shown to include points 198. Points 198 can represent different aspects of a room controlled by VAV 188. In some embodiments, VAV 188 has four points, one point associated with airflow and configurations of different fans, two points associated with the temperature controller by VAV 188, and one point associated with the configurations of equipment within VAV 188.

Processes

Figure 2:
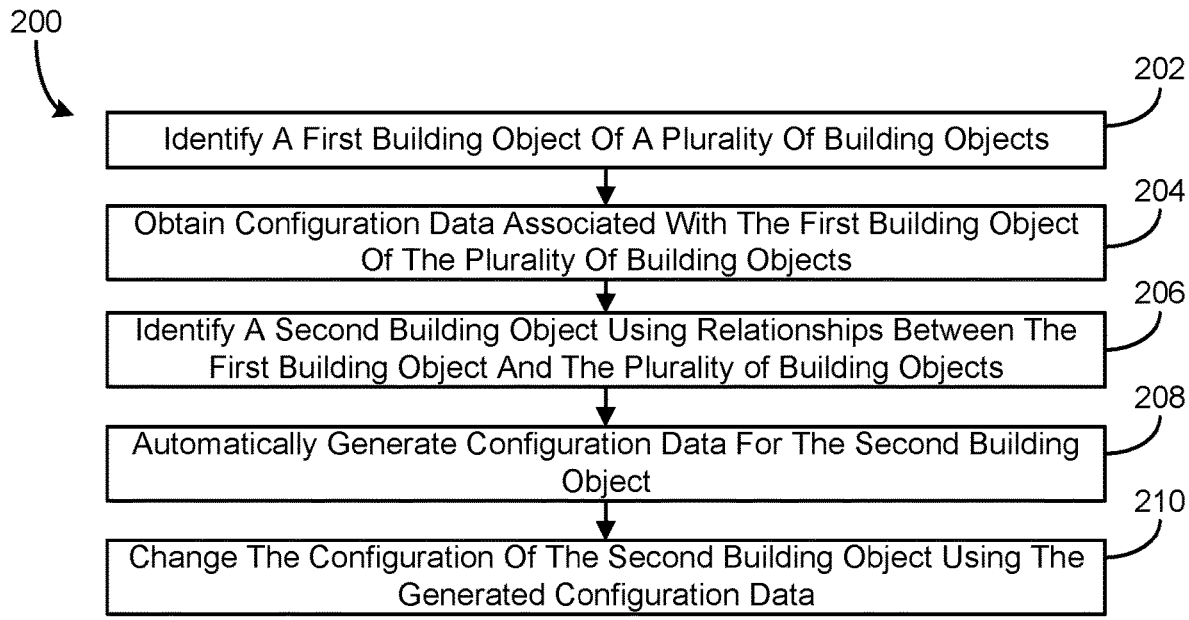
FIG. 2 is a flowchart of a process conducted by a configuration tool for automatically generating new configuration data for one building object based on configuration data of another building object, according to some embodiments.

Referring now to FIG. 2, a flowchart describing a process 200 conducted by configuration tool 161 for automatically generating new configuration data for one building object based on configuration data of another building object is shown, according to some embodiments. Process 200 is shown to include identify a first building object of a plurality of building objects (step 202). The first building object may be stored in building object database 142 and may be representative of either a piece of building equipment or a space in a building. For example, a conference room in a building may be cooled by fans and VAV boxes associated with the fans. Each of the conference room, the fans, and the VAV boxes may be represented by a building object within building objects database 142. The conference room may be represented by a space object. In some embodiments, the conference room may include a plurality of space objects representing different areas within the conference room. Further, each fan and VAV box may be represented as equipment objects within building objects database 142.

In some embodiments, configuration tool 161 can identify the first building object after identifying a space object and the space object's attributes including different characteristics (e.g. temperature, pressure, air flow, water flow, water temperature, etc.) associated with the space object and the equipment object that is associated with each characteristic. In some embodiments, configuration tool 161 only identifies one equipment object associated with the space object to avoid using excessive processing in searching for each equipment object that is associated with an attribute of the space.

Process 200 is further shown to include obtain configuration data associated with the first building object of the plurality of building objects (step 204). Configuration tool 161 can obtain configuration data associated with the first building object in a few manners. For example, if the first building object is an equipment object, configuration tool 161 can scan the inputs and outputs of the building equipment associated with the equipment object and determine the configuration of the equipment object by comparing the inputs and outputs to inputs and outputs in a database. In some embodiments, configuration tool 161 can input test signals into the building equipment and determine its configuration based on its output. For example, configuration tool 161 can input a sin wave signal with a small amplitude into a fan and read the output power. Configuration tool 161 can use the output power to determine how the fan is operating and is configured.

In some embodiments, configuration tool 161 can determine the configuration of an equipment object by scanning a selected configuration tag associated with the equipment object. After scanning the configuration tag, configuration tool 161 can determine the configuration of a piece of building equipment by comparing the configuration tag to a configuration tag in a database in BMS controller 12.

In some embodiments, configuration tool 161 can determine the configuration of a piece of building equipment by identifying the configuration from a user created mode of operation. For example, configuration tool 161 may determine that a fan is operating under the cooling mode of operation. Configuration tool 161 can scan the fan's associated equipment object and determine the fans configuration based on the configuration tag that is associated with the cooling mode of operation.

In some embodiments, configuration tool 161 can determine the configuration of a space object. The configuration of a space object may be different than the configuration of an equipment object because the configuration of a space object may include the configurations of each equipment object that is tagged as an attribute to the space object. For example, if an office is represented by a space object, the configuration of the space object could be the configuration of each equipment object associated with the office. In some embodiments, configuration tool 161 can determine the configurations of each of these equipment objects by examining inputs from sensors in the office and determining which configurations for the equipment objects could be associated with the inputs. For example, configuration tool 161 can examine the input temperature of the office to be 72 degrees and determine what configurations each equipment object would need to hold to create a temperature of 72 degrees.

Process 200 is further shown to include identify a second building object using relationship between the first building object and the plurality of building objects (step 206). Configuration tool 161 can identify the second building object after identifying the first building object by scanning the first building object for tags indicating relationships the first building object has with other building objects. For example, if configuration tool 161 identifies a conference room represented by a space object, configuration tool 161 can scan the space object for relationships that are in relationship database 152. Configuration tool 161 can then identify the second building object from the building objects that have a relationship with the first building object.

In some embodiments, configuration tool 161 can identify the second building object by determining which building object can change configurations to change the value of an attribute of a space object, such as the temperature of a conference room. For example, configuration tool 161 may receive a temperature input from a conference room indicating that the temperature is too hot. Configuration tool 161 can identify the conference room as the first building object and then identify a plurality of building objects that have a relationship with the conference room, such as fans, lighting, locks, etc. Configuration tool 161 can scan the relationships to determine which building object can change configurations to cool the conference room and identify that building object as the second building object.

In some embodiments, configuration tool 161 can identify a second building object based solely on its relationship with the first building object. For example, a VAV box may control the air access a single fan receives. If configuration tool 161 identifies the VAV box as the first building object, configuration tool 161 can use relationship between the VAV box and the fan to identify the fan as the second building object.

Process 200 is further shown to include automatically generate configuration data for the second building object (step 208). Configuration tool 161 can generate the configuration data for the second building object by using the configuration data associated with the first building object and the first and second building object's relationship with each other. To generate the configuration data for the second building object, configuration tool 161 can identify the configuration of the first building object based on the first building object's configuration tag. Once configuration tool 161 has identified the first building object's configuration tag, configuration tool 161 can identify a configuration tag for the second building object that is associated with the first building object's configuration tag. In some instances, configuration tool 161 can generate new configuration data for the second building object by mapping the configuration tag associated with the first building object to a configuration tag in a table in a database in BMS controller 12. For example, if a fan and a VAV box are serving a conference room (i.e. managing the temperature and airflow in the room) and configuration tool 161 determines that the fan has a cooling configuration tag. Configuration tool 161 can automatically determine that the VAV box should be configured to have a cooling tag as well by mapping the cooling configuration tag of the fan to the cooling configuration tag of the VAV box. An advantage to this step is configuration tool 161 only needs to know the configuration of the fan to ensure the VAV box is operating to cool the room instead of checking the configuration of each building object.

Process 200 is further shown to include change the configuration of the second building object using the generated configuration data (step 210). Configuration tool 161 can change the configuration of the second building object after it determines which configuration the second building object should have. For example, configuration tool 161 after determining that a VAV box needs to change its configuration to match the configuration of a fan it has a relationship with, configuration tool 161 can automatically select a matching tag associated with the VAV box. Once a configuration has been selected for a building object, such as the VAV box, equipment associated with the building object can start operating under the configuration associated with the tag.

Figure 3:
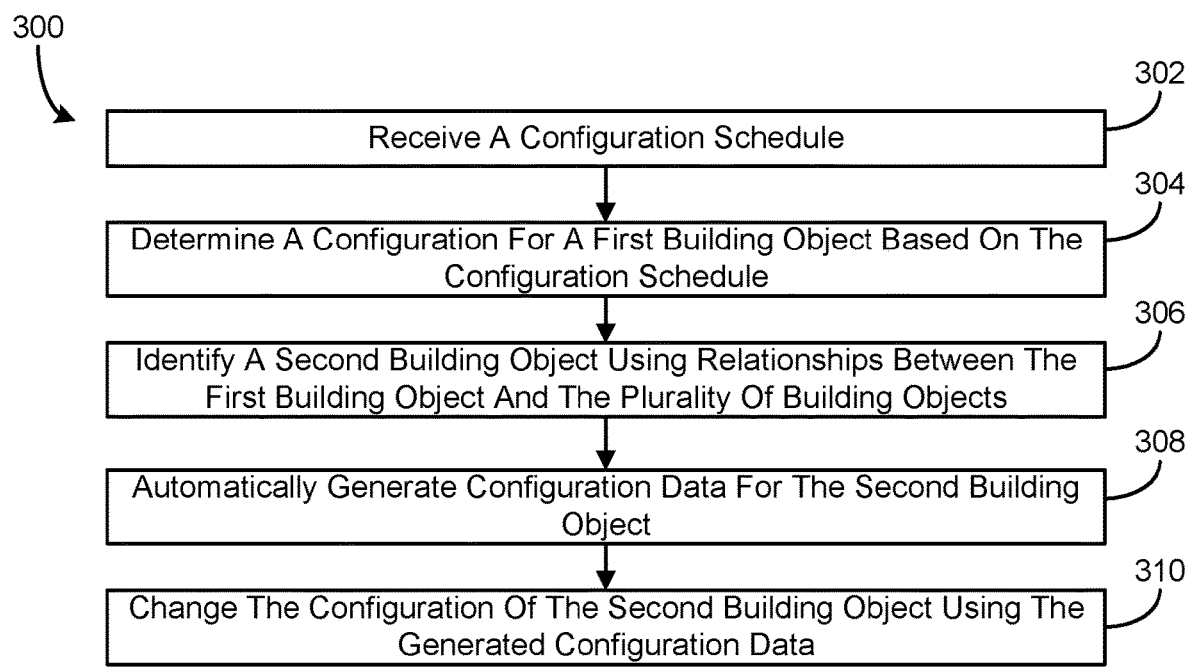
FIG. 3 is a flowchart of a process for changing a configuration of a second building object based on the second object's relationship with a first building object and a configuration schedule, according to some embodiments.

Referring now to FIG. 3, a process 300 for changing a configuration of a second building object based on the second object's relationship with a first object and a configuration schedule is shown, according to some embodiments. Process 300 includes receive a configuration schedule (step 302). Configuration tool 161 can receive a configuration schedule from a user input. The configuration schedule may identify configurations for different building objects. In some embodiments, the configuration schedule may include a time object that controls the times for when the building objects should be configured in each configuration. In some embodiments, configuration schedules only indicate configurations for building objects at a given time.

In some embodiments, the configuration schedules do not identify each and every building object that is associated with a goal of the configuration schedule. For example, a configuration schedule may be implemented into configuration tool 161 that is intended to cool an entire building. The schedule may only include configuration data for a few fans and/or VAV units of the plurality of fans and/or VAV units that operate to keep a building cool. Process 300 allows for BMS controller 12 to control the configurations of each fan and/or VAV unit despite not explicitly receiving information on what their configurations should be.

Process 300 is further shown to include determine a configuration for a first building object based on the configuration schedule (step 304). Similar to steps 202 and 204 of process 200, configuration tool 161 can determine the configuration for the first building object from the configuration schedule by first identifying the building object from building object database 142 and then identifying which configuration will achieve a desired result by identifying a configuration tag associated with the configuration schedule. For example, a configuration schedule may indicate that water in a building needs to be heated at 12 pm every day. Configuration tool 161 can identify a building object associated with a boiler in the building and ensure that the boiler is configured to heat water in the building at 12 pm every day. Configuration tool 161 can do so by identifying a selected configuration tag associated with heating water.

Process 300 is further shown to include identify a second building object using relationship between the first building object and the plurality of building objects (step 306). Configuration tool 161 can identify the second building object similar to how configuration tool 161 identified the second building object in step 206.

Process 300 is further shown to include automatically generate configuration data for the second building object (step 308). Configuration tool 161 can generate configuration data for the second building object similar to how configuration tool generated configuration data in step 208. An advantage to this system is the configuration schedule does not need to include configuration data for the second building object for configuration tool 161 to determine the second building object's configuration. Instead, configuration tool 161 can determine the second building object's configuration using solely the selected configuration tag associated with the first building object.

Process 300 is further shown to include change the configuration of the second building object using the generated configuration data (step 310). Configuration tool 161 can change the configuration of the second building object similar to how configuration tool 161 changed the configuration of a second object in step 210.

Figure 4:
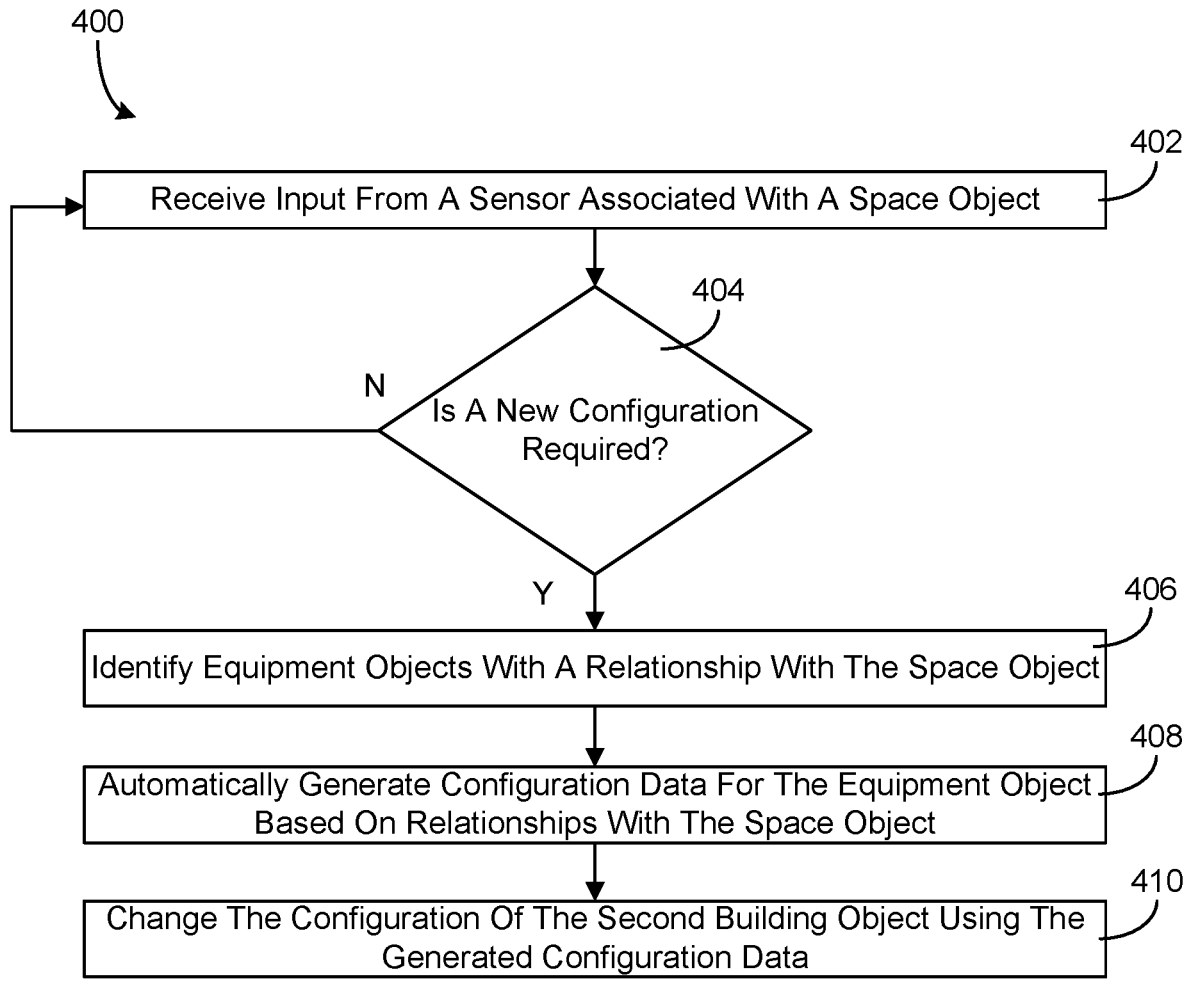
FIG. 4 is a flowchart of a process for automatically generating configuration data for a second building object based on an input and configuration data associated with a space object, according to some embodiments.

Referring now to FIG. 4, a process 400 for automatically generating configuration data for a second building object based on an input and configuration data associated with a space object is shown, according to some embodiments. Process 400 is shown to include receive input from a sensor associated with a space object (step 402). BMS controller 12 can receive an input from a variety of sensors. The input can have a first value associated with an attribute of the space object associated with the input. For example, a conference room may be represented by a space object within building object database 142. A thermometer within a conference room can constantly monitor the temperature in the conference room and send temperature inputs representing the temperature of the conference at different time intervals or upon being polled by BMS controller 12.

Process 400 is further shown to include is a new configuration required? (step 404). Upon receiving the input from a sensor, configuration tool 161 can determine whether the input is within a user selected range. For example, if the input is a temperature reading of an office space and reads to be 76 degrees and a manager of the office space sets the threshold to be 72 degrees, configuration tool 161 can determine the temperature is above the temperature threshold and needs to be adjusted by changing the configurations of building equipment associated with the temperature of the office space. If configuration tool 161 determines that the value is not above an associated threshold, configuration tool 161 may not do anything other than wait for the next reading.

Process 400 is further shown to include identify first equipment objects with a relationship with the space object (step 406). If configuration tool 161 determines that a value is above a user selected threshold, configuration tool 161 can determine which building equipment is associated with the value and consequently has a relationship with the space object associated with value. For example, continuing with the temperature reading from above, configuration tool can determine each piece of building equipment that is associated with the temperature of the office space and identify the equipment objects from building object database 142 associated with the determined building equipment. Further configuration tool 161 can identify the relationships the equipment objects share with the space object stored in relationship database 152.

In some embodiments, when identifying the related equipment objects, configuration tool 161 can determine which equipment objects to identify based on which sensor sent the value. For example, if a thermometer sent the value, configuration tool 161 may know to the value is associated with the temperature of the room associated with the thermometer and consequently identify equipment objects representing building equipment that controls the temperature of the room, such as fans and VAV boxes. Configuration tool can identify equipment objects based on values receives related to any characteristic of an area or space, such as temperature, pressure, air flow, water flow, water temperature. Further, sensors that input values can be any type of sensor dedicated to receiving data from a characteristic of a space.

Process 400 is further shown to include automatically generate configuration data for the equipment object based on relationship with the space object (step 408). Configuration tool 161 can generate configuration data for the equipment objects using relationships with the space objects similar to how configuration tool generated configuration data in step 208.

Process 400 is further shown to include change the configuration of the second building object using the generated configuration data (step 410). Configuration tool 161 can change the configuration of the second building object similar to how configuration tool 161 changed the configuration of a second building object in step 210.

Exemplary Embodiments

Figure 5A:
FIG. 5A is an illustration of a graphical user interface showing an outside air temperature attribute in a building object database, according to some embodiments.

Referring now to FIG. 5A, an illustration 500 of a graphical user interface showing an outside air temperature attribute in building object database 142 is shown, according to some embodiments. Illustration 500 shows a space outside of a building with an outside air temperature attribute, OA-T. Under an old system, to use the OA-T to perform tasks by AHUs, boilers, chillers, etc., a BMS controller would identify what controllers are dependent on the outside air temperature, identify the space where the outside air temperature is taken, create a new object that will interlock the outside air temperature with the controllers, and manually designate the outside air temperature and controller links in the new object. The process is time consuming and tedious.

Using the relationship model described herein, the process can be simpler. To obtain the outside air temperature and change the configurations of AHUs, Boilers, chillers, etc., BMS controller 12 can automatically find the outside air temperature by polling a sensor outside and receiving an input. BMS controller 12 can then automatically connect the equipment using their relationships to each other and change each equipment's configuration based on the needs of the system via configuration tags.

Figure 5B:
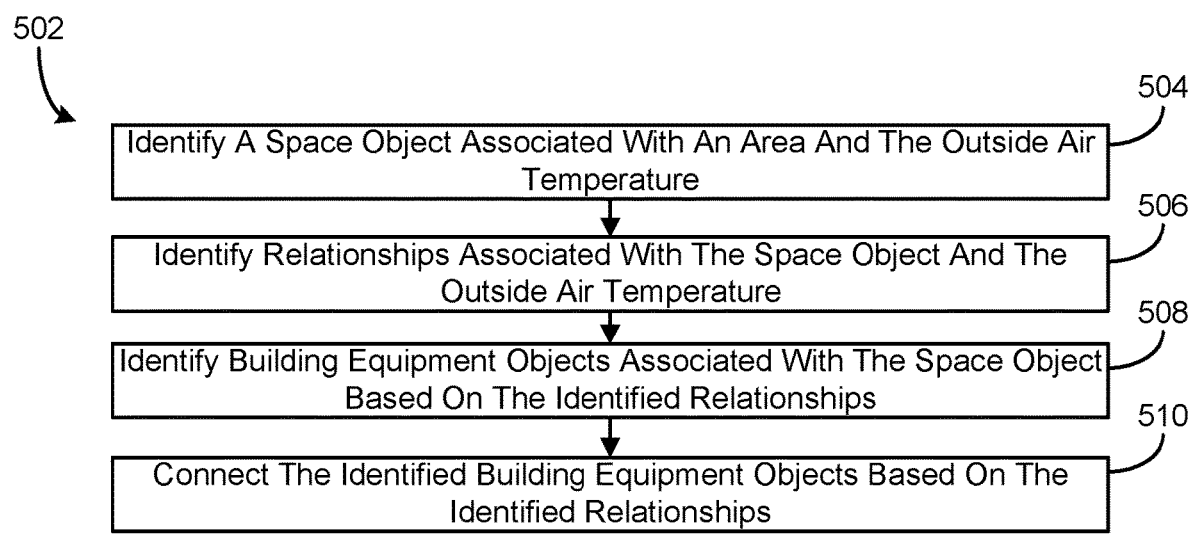
FIG. 5B is a flowchart of a process for automatically connecting building equipment objects based on relationships of the building equipment, according to some embodiments.

Referring now to FIG. 5B, a flowchart of a process 502 for automatically connecting building equipment objects based on relationships of the building equipment is shown, according to some embodiments. Process 502 includes identify a space object associated with an area (step 504), identify relationships associated with the space object and the outside air temperature (step 506), identify equipment objects associated with the space object based on the identified relationships (step 508), and connect the identified equipment objects based on the identified relationships (step 510).

At step 504, BMS controller 12 can identify areas from which air is pulled and used as an input into a building. BMS controller 12 can identify space objects associated with the areas from building object database 142. At step 506, BMS controller 12 can identify relationships between the space objects and equipment objects that use air from the areas associated with the space objects. BMS controller 12 can do so by examining tags associated with the space object that indicate different relationships. At step 508, BMS controller 12 can identify equipment objects that use the outside air to operate and consequently have a relationship with the identified space object. BMS controller 12 can identify the equipment objects by analyzing the relationship tags associated with the space objects. At step 510, BMS controller 12 can automatically connect equipment objects associated with building equipment that uses the outside air so the building equipment associated with the equipment objects can all operate knowing the outside air temperature.

Figure 6A:
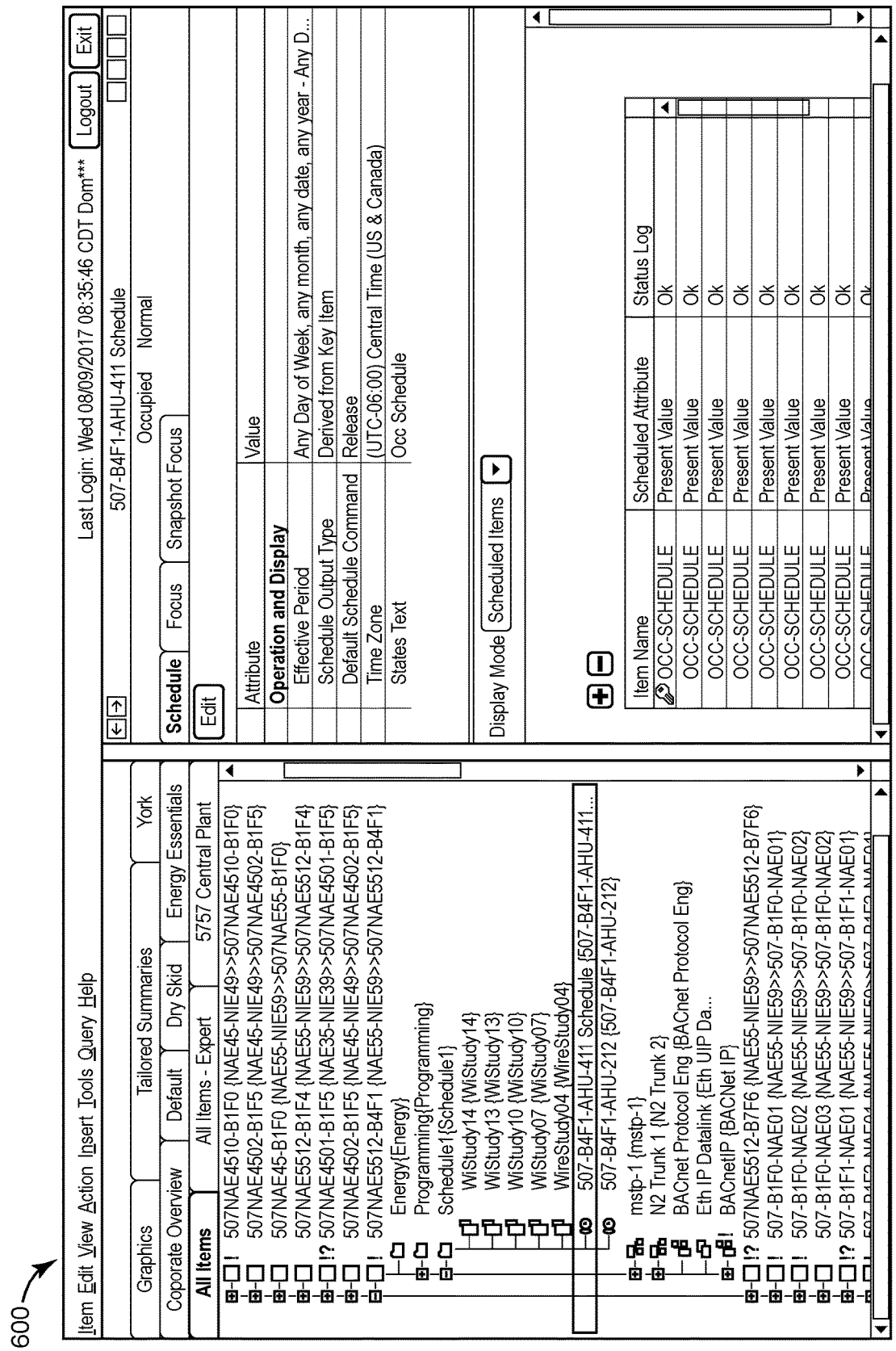
FIG. 6A is an illustration of a graphical user interface showing an occupancy schedule in a building object database, according to some embodiments.

Referring now to FIG. 6A, an illustration 600 of a graphical user interface showing an occupancy (occ) schedule in building object database 142 is shown, according to some embodiments. Illustration 600 shows a plurality of choices a user can use to implement an occupation schedule to control various equipment object (not shown). Illustration 600 shows different attributes of the schedule such as the effective period of the occupation schedule, the schedule output type, the default schedule command, the time zone associated with the schedule, and the state the building is currently in. In some embodiments, more or less attributes may be shown. A user viewing the interface can alter the values associated with each of these attributes by clicking on the value in the interface and typing or writing a new value in.

Referring now to FIG. 6B, an illustration 602 of a graphical user interface showing different states the occ-schedule may be in building object database 142 is shown, according to some embodiments. Examples of states are occupied, unoccupied, standby, not set, etc. Illustration 602 shows an item number, a command, a priority, and a delay setting for each state.

Using previous building systems, when implementing occupation based control schedules and after controllers for AHU or RTUs are brought into the system as building objects, a schedule object must be manually added to control the OCC-schedule point. After adding the scheduling object, the schedule must then be configured for that unit. Once the main piece of equipment is configured, the technician can either add all child scheduling points (VAVs, FPBs, FCUs, etc) to the same schedule or they can add an interlock between the main serving equipment and the terminal units.

Using the relationship model described herein, BMS controller 12 can avoid each step listed above and instead receive a parent serving equipment schedule that is configured by a technician and then automatically configure the serving equipment with matching schedules. The system can do so by identifying configuration tags of equipment objects associated with the parent building objects, identifying child building objects by identifying relationships between the objects, matching the selected configuration tag of the parent building object with a configuration tag of the child building object, and generating new configuration associated with the matched child configuration tag. In some embodiments, parent serving equipment is equipment that BMS controller 12 first identifies when generating configuration data for different building equipment.

Figure 6C:
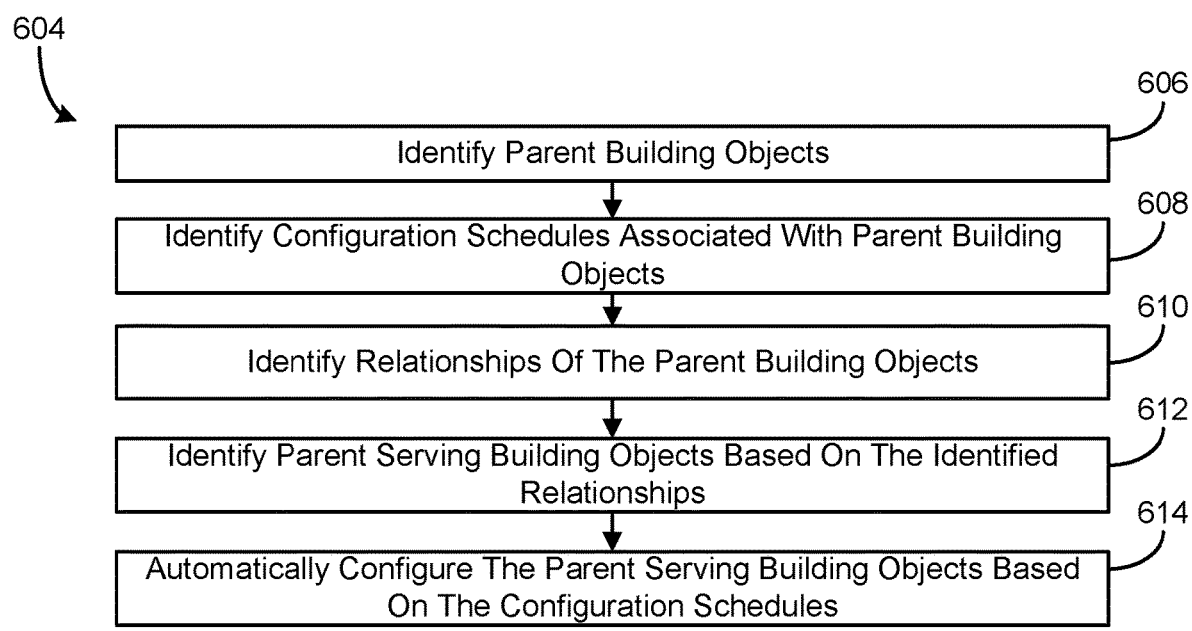
FIG. 6C is a flowchart of a process for automatically connecting building equipment based on relationships between the building equipment and the building equipment's configurations when operating under different schedules, according to some embodiments.

Referring now to FIG. 6C, a flowchart of a process 604 for automatically connecting building equipment based on relationships between the building equipment and the building equipment's configurations when operating under different schedules, according to some embodiments. Process 604 includes identify parent equipment objects (step 606), identify configuration schedules associated with parent equipment objects (step 608), identify relationships associated with the parent equipment objects (step 610), identify parent serving equipment objects based on the identified relationships (step 612), and automatically configure the parent serving equipment objects based on the configurations schedules (step 614).

At step 606, BMS controller 12 can identify parent equipment objects from building object database 142. Parent equipment objects may be objects associated with building equipment that provides inputs to other building for example. For example, an AHU may be a parent equipment object because it provides air to a VAV, in some embodiments. At step 608, BMS controller 12 can identify configuration schedules associated with the parent equipment objects. BMS controller 12 can identify the configuration schedules by locating them in a database within BMS controller 12. The configuration schedules may be manual inputs by a technician into BMS controller 12 or the configuration schedules can be automatically generated based on sensor input data. For example, if BMS controller 12 receives sensor inputs indicating that the setpoint temperature of a room is too low, BMS controller 12 may identify a configuration schedule for an AHU that will increase the temperature of the room. At step 610, BMS controller 12 can identify relationships that parent equipment objects have with other equipment objects. For example, an AHU may have a relationship with a VAV because the AHU provides air to the VAV. BMS controller 12 can identify the relationships of the building equipment as an object.

At step 612, BMS controller 12 can identify the equipment objects that have a relationship with the parent equipment object. In some instances, BMS controller 12 can identify equipment objects associated with building equipment receives inputs from the parent equipment object as parent serving building equipment. At step 614, BMS controller 12 can automatically configure the identified parent serving equipment objects similar based on the configuration of the parent equipment object and each parent serving equipment object relationship with the parent equipment object. Advantageously, technicians can save time in implementing new configurations for equipment that receives inputs from parent building equipment by only integrating new configuration schedules into the parent building equipment so BMS controller 12 can automatically integrate the new configuration schedules for the equipment that receives inputs from the parent building equipment.

Figure 7A:
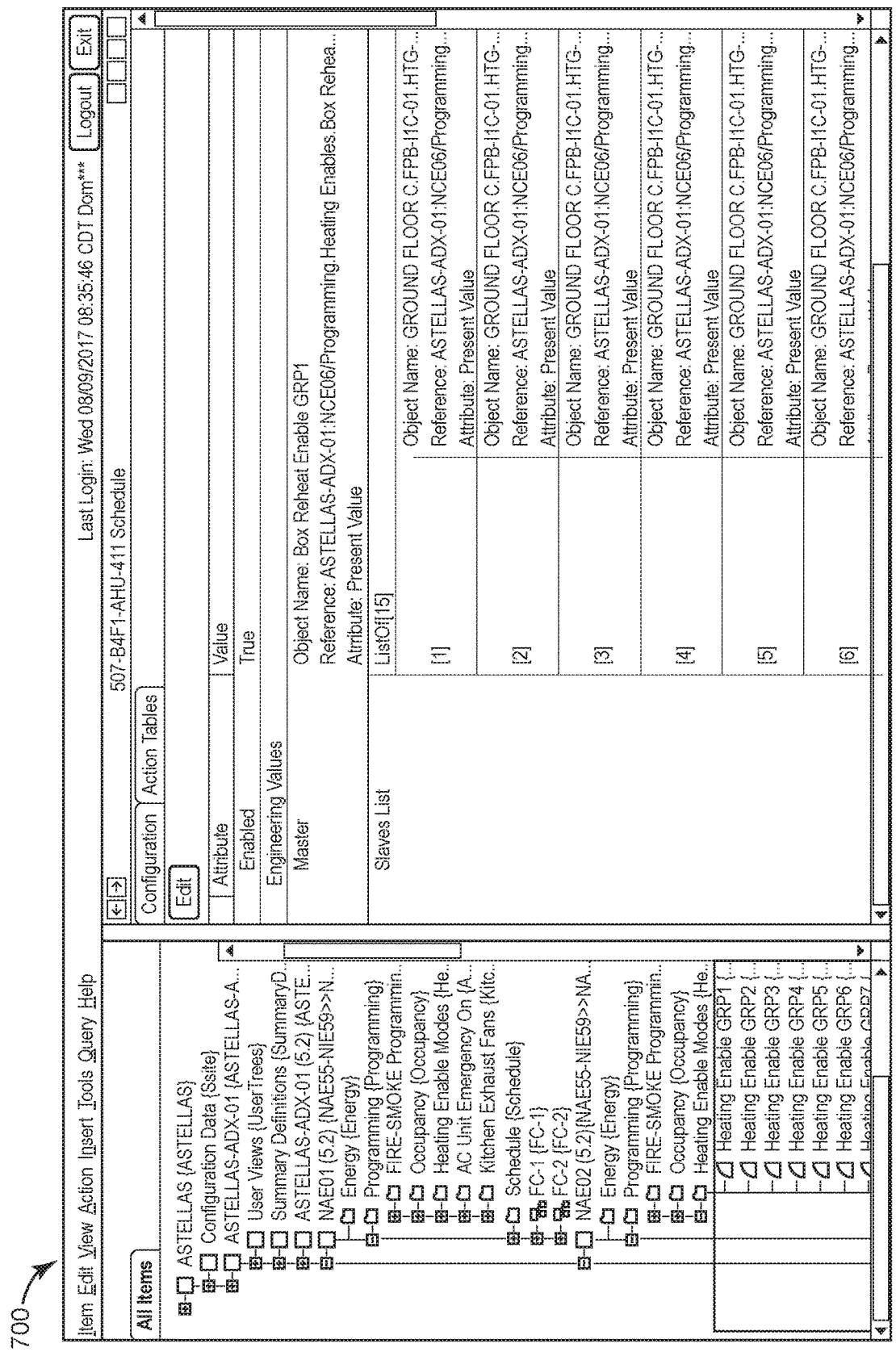
FIG. 7A is an illustration of a graphical user interface showing equipment objects that use heating hot water in a building object database, according to some embodiments.

Referring now to FIG. 7A, an illustration 700 of a graphical user interface showing equipment objects that use heating hot water such as an AHU, a VAV etc., in building object database 142 is shown, according to some embodiments. Under previous embodiments, to connect a boiler "on" point to any such piece of equipment, an interlock, global share or LCT must be created to connect "on" point to these pieces of equipment. This was done so if the boilers are "off" the pieces of equipment do not attempt to use heating hot water.

A BMS controller 12 implementing the relationship model described herein may not need to perform the steps listed above to avoid pieces of equipment using water that has not been heated yet. Instead, BMS controller 12 can automatically determine temperature of the hot water at a designated space using sensors. BMS controller 12 can then use tagged relationships between equipment objects and the space object to determine new configurations for the equipment objects. (e.g. BMS controller 12 can determine the water is heated from sensor data and then designate a configuration tag to equipment that would otherwise use the water if it was heated, stopping the equipment from using the non-heated water)

Figure 7B:
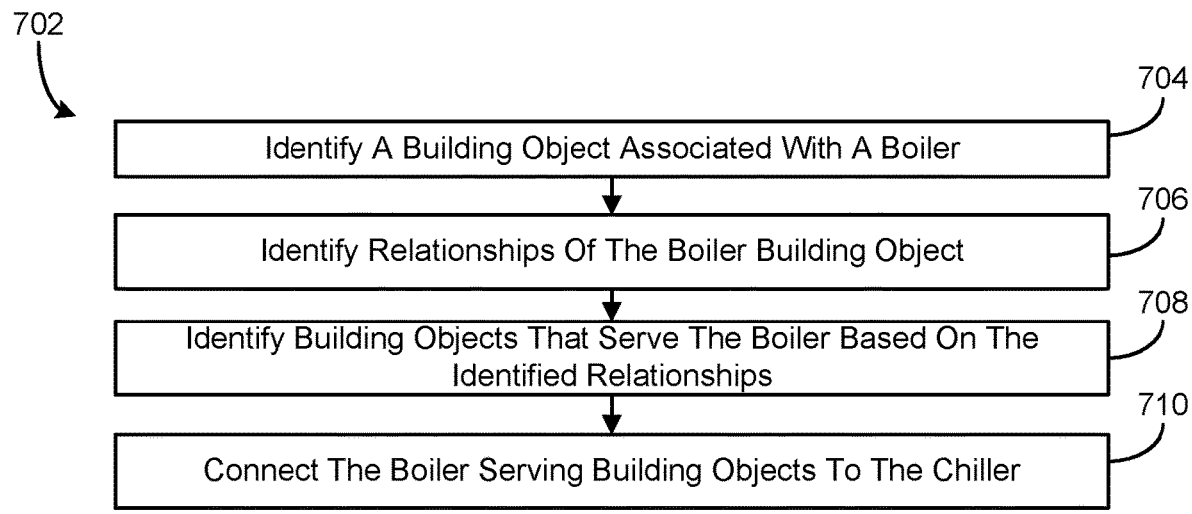
FIG. 7B is a flowchart of a process for automatically connecting building equipment based on relationships of the building equipment and a boiler, according to some embodiments.

FIG. 7B is a flowchart of a process 702 for automatically connecting building equipment based on relationships of the building equipment and a boiler, according to some embodiments. Process 702 includes identify an equipment object associated with a boiler (step 704), identify relationships of the boiler object (step 706), identify equipment objects associated with building equipment that serve the boiler based on the identified relationships (step 708), connect the boiler serving equipment objects to the boiler equipment object (step 710).

At step 704, BMS controller 12 identifies an equipment object associated with a boiler from building object database 142. BMS controller 12 can identify the equipment object by scanning building object database 142 for objects tagged with the associated boiler. At step 706, BMS controller 12 can identify relationships the boiler equipment object has with other equipment objects. The relationships can represent connections between the boiler and building equipment that uses water that the boiler heats up and equipment objects associated with the boiler and the building equipment. At step 708, BMS controller 12 can identify the equipment objects associated with the relationship and the building equipment associated with the equipment objects. At step 710, BMS controller 12 can connect the identified equipment objects to the equipment object associated with the boiler so the building equipment associated with the equipment objects do not use water that has not yet been heated by the boiler.

In another implementation, the same systems and methods represented in illustration 700 and discussed in reference process 702 can be used with equipment that uses chilled water instead of heated water. BMS controller 12 can determine which pieces of building equipment would normally use chilled water and configure the building objects associated with the building equipment to avoid using the chilled water until water has been properly chilled. BMS controller 12 can use configuration tool 161 to use relationship and configuration tags to configure the equipment objects.

Figure 7C:
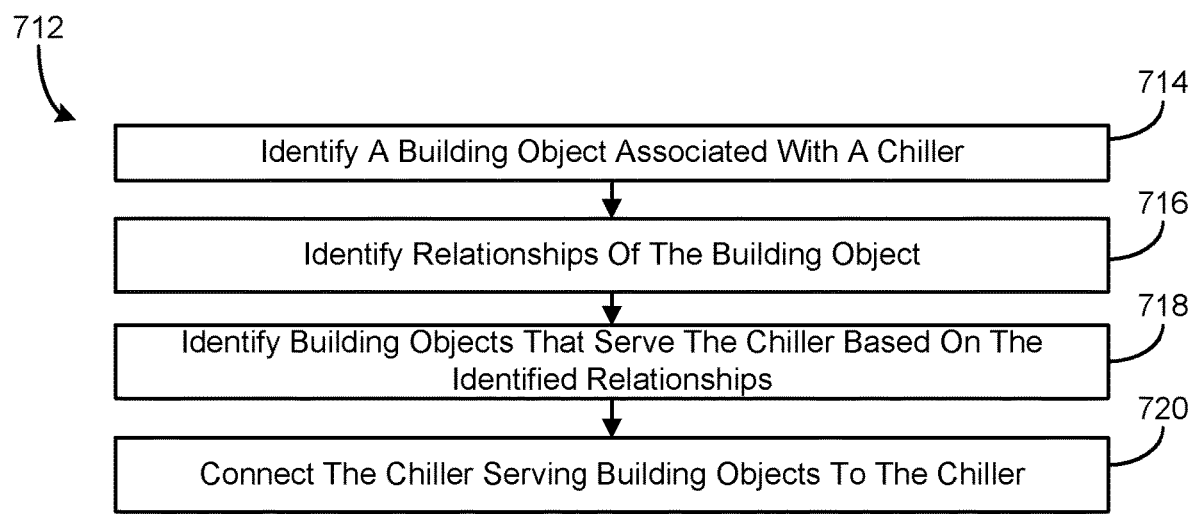
FIG. 7C is a flowchart of a process for automatically connecting building equipment based on relationships of the building equipment and a chiller, according to some embodiments.

FIG. 7C is a flowchart of a process 712 for automatically connecting building equipment based on relationships of the building equipment and a chiller, according to some embodiments. Process 712 includes identify an equipment object associated with a chiller (step 714), identify relationships of the equipment object (step 716), identify equipment objects associated with the relationships (step 718), and connect the chiller server equipment objects to the chiller equipment object (step 720).

At step 714, BMS controller 12 identifies an equipment object associated with a chiller from building object database 142. BMS controller 12 can identify the equipment object by scanning building object database 142 for objects tagged with the associated chiller. At step 716, BMS controller 12 can identify relationships the chiller equipment object has with other equipment objects. The relationships can represent connections between the chiller and building equipment that uses water that the chiller cools down and equipment objects associated with the chiller and the building equipment. At step 718, BMS controller 12 can identify the equipment objects associated with the relationships and the building equipment associated with the equipment objects. At step 720, BMS controller 12 can connect the identified equipment objects to the equipment object associated with the chiller so the building equipment associated with the equipment objects do not use water that has not yet been chilled by the chiller.

Figure 8A:
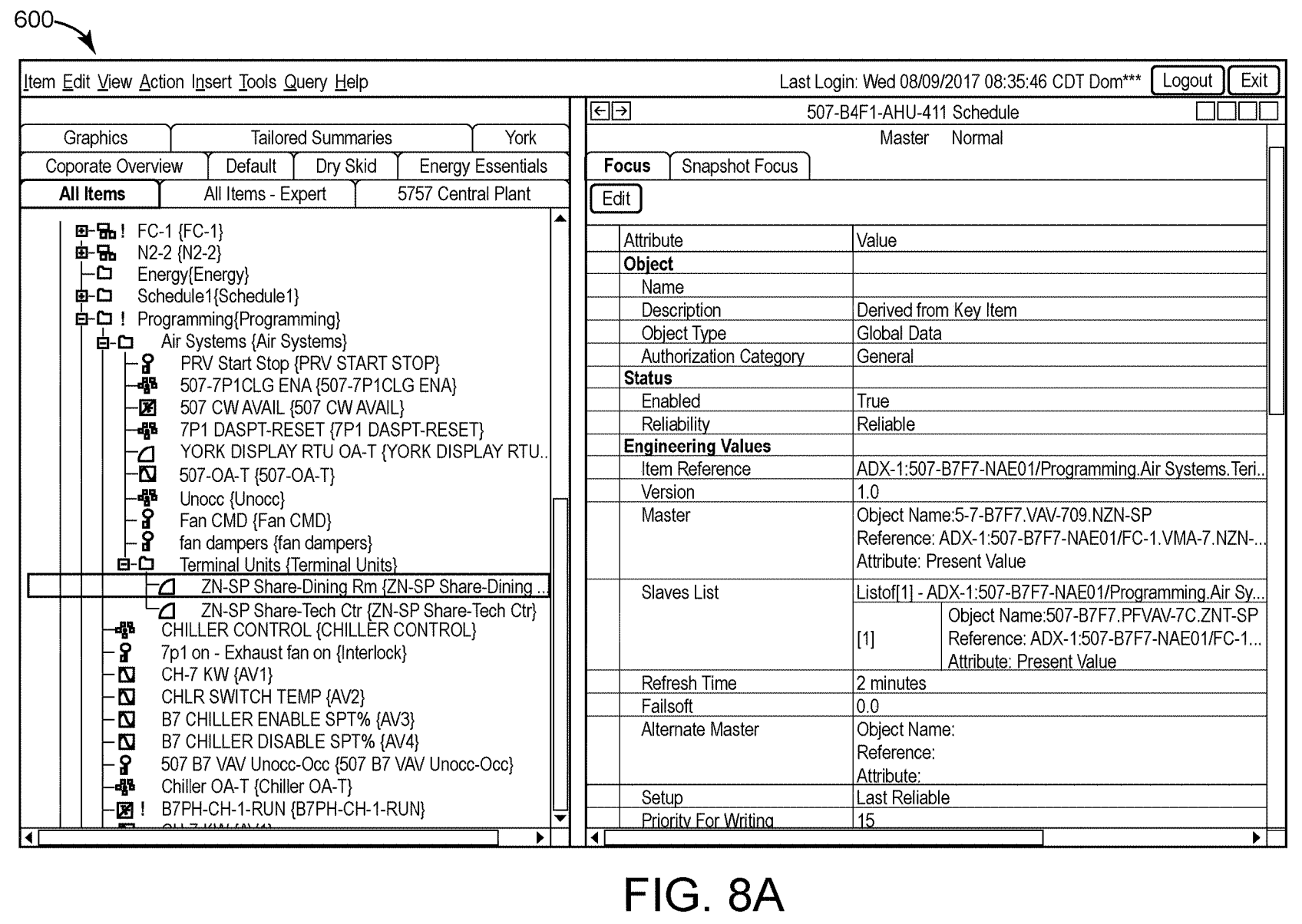

Referring now to FIG. 8A, an illustration 800 of a graphical user interface showing a view of building object database 142 showing how zone temperatures are shared between pieces of building equipment within building object database 142 is shown, according to some embodiments. Under previous embodiments there were 2 main ways of sharing zone temperatures to other pieces of equipment. The first way is to use a peer-to-peer share from controller to the other. This is only applicable if both controllers lie on a multiple spanning tree protocol (MSTP) trunk. If they are on separate trunks, then a global share or layer coding transport (LCT) object must be added in a network application environment (NAE) to write the one zone temperature to the other controller.

A BMS controller 12 implementing the relationship model described herein can avoid all of these steps by simply identifying spaces associated with the zone temperature and identifying the equipment that has a relationship with the spaces and the temperature of the spaces. BMS controller 12 can then identify configuration tags and at least one object to determine a configuration of the equipment that controls the temperature of the areas. BMS controller 12 can then identify other equipment that impacts the temperature of the space by scanning the first equipment for relationships. Finally, BMS controller 12 can change the configuration of the other equipment by selecting a configuration tag that matches the configuration of the first equipment that BMS controller 12 identified.

Figure 8B:
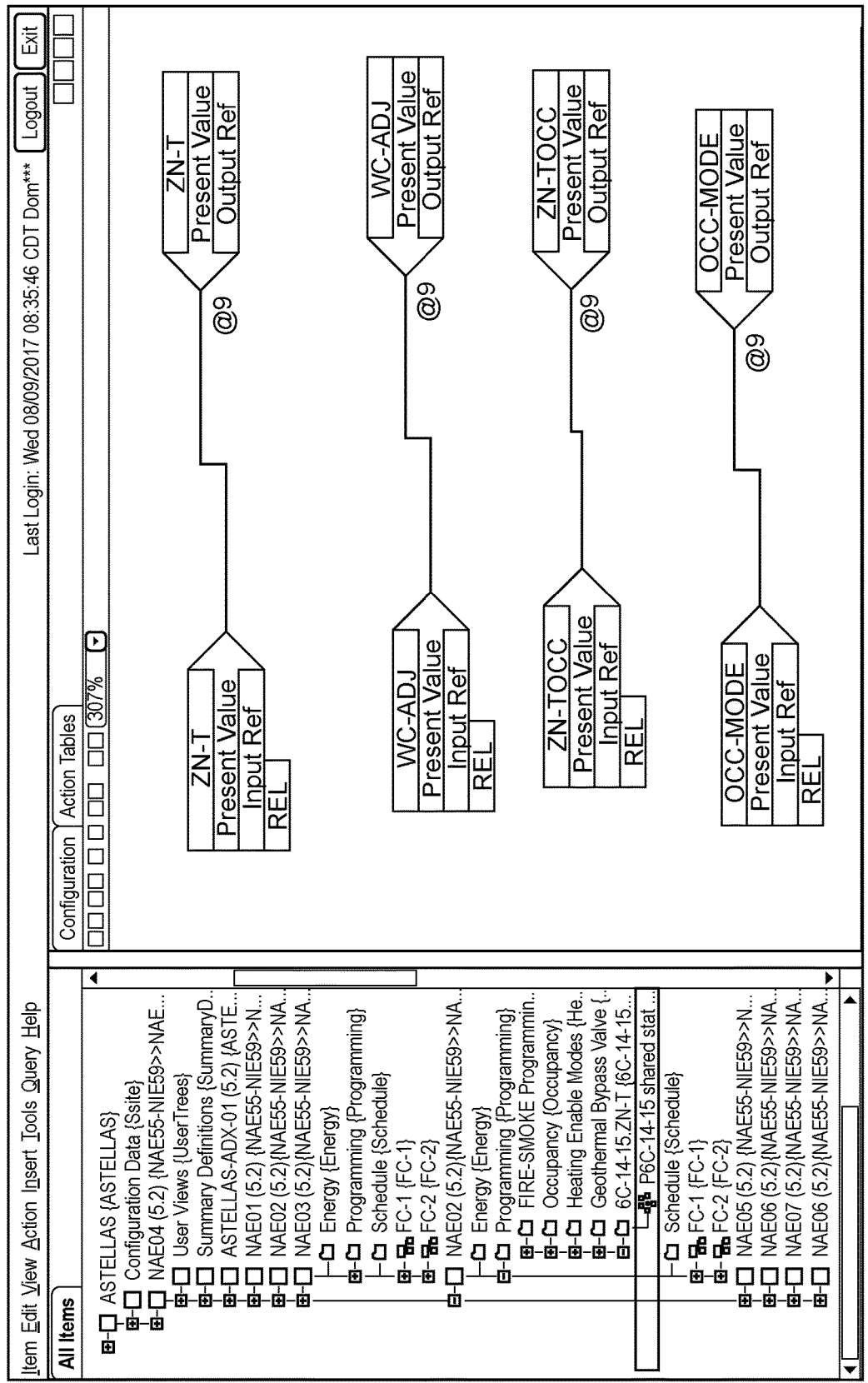
FIG. 8B is an illustration of another graphical user interface showing how zone temperatures are shared between pieces of building equipment within a building object database, according to some embodiments.

Referring now to FIG. 8B, another illustration 802 of a graphical user interface showing how common variables can be shared between controllers is shown, according to an exemplary embodiment. In some systems, multiple data objects are stored and maintained to represent the same physical quantity (e.g., zone temperature, occupancy, outdoor air temperature, etc.). Each controller may receive one of the data objects as an input and may use the value of the data object to perform control operations. For example, multiple controllers may use the zone temperature (ZN-T) of a space, but each controller may be linked to a separate zone temperature data object. A mapping between the data objects that represent the same physical quantity, as shown in FIG. 8B, can be used to link the data objects together to ensure that all the data objects have the same value.

In another implementation, BMS controller 12 can implement the relationship model described herein to create a static pressure reset schedule for different pieces of building equipment. Previous controllers would use a labor intensive work flow where damper percentages are brought into an LCT object and Min and Max flows are calculated and based on specific time intervals, the AHU/RTU's static pressure setpoint would then be bumped up or down.

BMS controller 12 operating under the relationship model described herein would not need to implement the steps listed above. Instead, a technician could select a static pressure reset strategy schedule that specifies different configurations of pieces of building equipment through equipment objects in building object database 142. BMS controller 12 could then automatically configure the air serving equipment and the associated terminal devices for static pressure reset and logic/connections may be automatically created. BMS controller 12 may do so by automatically identifying the building equipment objects in building object database 142 tagged with the configuration schedule along with the associated configuration tags. BMS controller 12 can then automatically identify relationships between the equipment objects and match configuration tags between the related equipment objects to configure the air serving equipment.

In another implementation, BMS controller 12 can implement the relationship model described herein to automatically warm-up or cool-down different pieces of equipment. Previous controllers would warm-up and cool-down pieces of equipment by creating an interlock to tie the serving equipment (AHU/RTU) to terminal equipment (VAV, FPB, etc.) so prior to when a unit starts up, the system can enter warm-up or cool-down mode.

BMS controller 12 would not need to implement the steps listed above operating under the relationship model described herein. Instead, a technician may select a warm-up/cool-down strategy and the system can automatically configure air serving equipment and associated terminal devices for warm-up/cool-down and logic/connections can be automatically created. The system can do so by identifying relationship between the air-serving pieces of equipment objects within building object database 142 and finding matching tags between related air-serving equipment objects to generate a configuration for each piece of equipment to warm-up or cool-down.

Figure 8C:
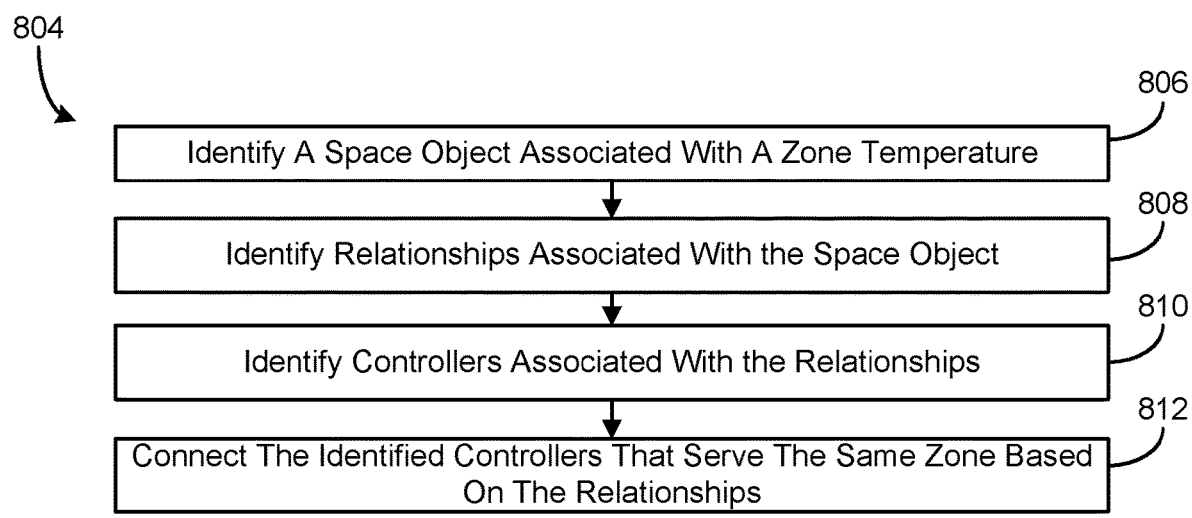
FIG. 8C is a flowchart of a process for automatically connecting building equipment based on relationships of the building equipment and a zone temperature of an area, according to some embodiments.

Referring now to FIG. 8C, a flowchart of a process 804 for automatically connecting building equipment based on relationships of the building equipment and a zone temperature of an area is shown, according to some embodiments. Process 804 includes identify a space object associated with a zone temperature (step 806), identify relationships associated with the space object (step 808), identify controllers associated with the relationships (step 810), connect the identified controllers and that serve the same zone based on the relationships (step 812).

At step 806, BMS controller 12 can automatically identify a space object associated with an area that a technician selects to be controlled by one or more controllers and equipment objects of the controllers. The space object can be associated with an area inside or outside of a building. At step 808, BMS controller 12 can automatically identify relationships of the identified space object and each equipment object that services characteristics of the area associated with the space object. BMS controller 12 can identify any number of relationships. BMS controller 12 can identify relationships the space object has with specific equipment objects, such as, but not limited to, equipment objects of controllers servicing the area. A controller can service an area by changing configurations of building equipment to bring values of characteristics of the area to a setpoint. The building equipment can service an area by providing an input to the area to bring a characteristic to a setpoint. In some embodiments, BMS controller 12 identifies all of the relationships the space object has with equipment objects.

At step 810, BMS controller 12 can automatically identify controllers based on the identified relationships. To do so, BMS controller 12 can parse through the relationships looking for tags indicating the relationship is with a controller serving the area associated with the space object. BMS controller 12 can identify equipment objects associated with each controller that controls the temperature of the area. After identifying the equipment objects of the controllers, at step 812, BMS controller 12 can connect the identified equipment objects of the controllers that serve the area so the controllers can operate together. In some embodiments, by connecting the equipment objects of the controllers, BMS controller 12 can avoid the controllers fighting against each other when the controllers are adjusting the temperature. Instead, the controllers can work together.

Figure 9:
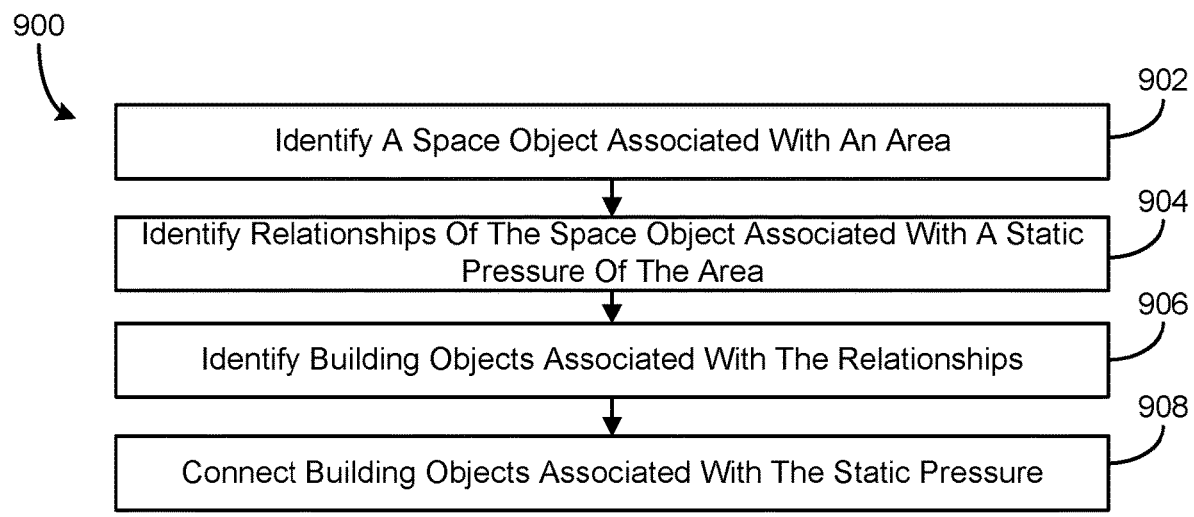
FIG. 9 is a flowchart of a process for automatically connecting building equipment based on relationships of the building equipment and a static pressure of an area, according to some embodiments.

Referring now to FIG. 9, a flowchart of a process 900 for connecting building equipment based on relationships of the building equipment and a static pressure of an area is shown, according to some embodiments. Process 900 includes identify a space object associated with an area (step 902), identify relationships of the space object associated with a static pressure of the area (step 904), identify building objects associated with the relationships (step 906), and connect building objects associated with the static pressure (step 908).

At step 902, BMS controller 12 can identify a space object associated with an area that a technician selects. BMS controller 12 can identify space objects associated with any number of areas. BMS controller 12 can identify the space object to connect building equipment that controls the static pressure of the area. After identifying the space object, at step 904, BMS controller 12 can identify relationships of the space object with equipment objects associated with building equipment that controls the static pressure of the area. In some embodiments, BMS controller 12 identifies relationships between all equipment objects and the space object.

At step 906, BMS controller 12 can identify building objects associated with the identified relationships. From the relationships and using tags indicating what aspects of a building that building equipment impacts, or services, BMS controller 12 can identify equipment objects associated with building equipment that specifically affects the static pressure of the area and/or BMS controller 12 can identify equipment objects associated with all of the relationships. At step 908, BMS controller 12 can connect the identified equipment objects based on the identified relationships of the equipment objects and static pressure tags of the equipment objects.

Figure 10:
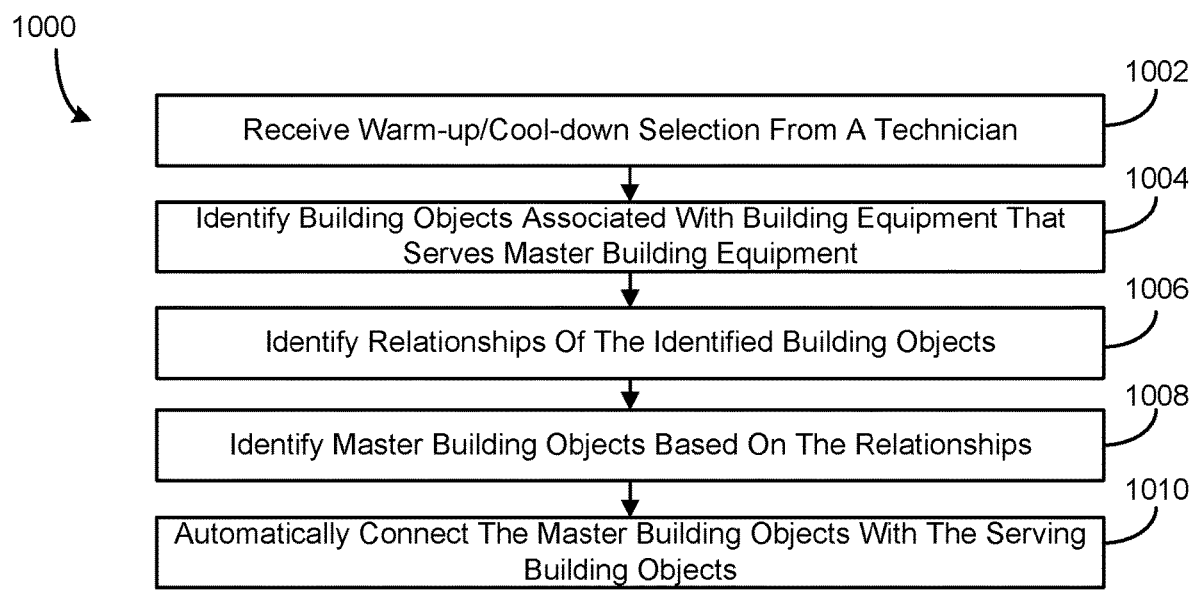
FIG. 10 is a flowchart of a process for automatically connecting building equipment based on relationships of master building equipment and serving building equipment, according to some embodiments.

Referring now to FIG. 10, a flowchart of a process 1000 for automatically connecting building equipment based on relationships of master building equipment and serving building equipment is shown, according to some embodiments. Process 1000 includes receive warm-up/cool-down selection from a technician (step 1002), identify space object associated with an area (step 1004), identify relationships of the space object (step 1006), identify terminal equipment objects based on the relationships (step 1008), identify relationships of the terminal equipment objects (step 1010), identify serving equipment objects based on the relationships (step 1012), and connect the terminal building objects with the serving building objects (step 1014).

At step 1002, BMS controller 12 can receive a selection from a technician to connect equipment objects associated with building equipment that serve a common area (represented by a space object) and operate together to warm up and/or cool down together. In this instance, when building equipment operates together, a piece of building equipment serves a terminal piece of building equipment. For example, an AHU may provide air to a VAV. In this example, the AHU is the serving piece of building equipment and the VAV is the terminal piece of building equipment. Any type of building equipment can operate together. Advantageously, if serving building equipment and terminal building equipment warm-up and cool-down together, they can operate at the same time without any lag waiting for another piece of building equipment to warm-up or cool down.

At step 1004, BMS controller 12 can identify the space object associated with the space that the technician selects from building object database 142. BMS controller 12 can identify any number of space objects for different spaces. After identifying the space object, at step 1006, BMS controller 12 can identify relationships of the space object with equipment objects associated with building equipment that can impact different characteristics of the space associated with the space object. For example, a VAV can have a relationship with a conference room because it impacts the temperature of the conference room. At step 1006, the VAV's relationship with the conference room is identified. At step 1008, BMS controller 12 can identify terminal equipment objects associated with the relationships from building object database 42. Terminal equipment objects are equipment objects associated with building equipment that are used as a final output to service an area. For example, the VAV of the example above can be a terminal piece of building equipment because an AHU provides air to the VAV before the VAV provides air to the conference room. Continuing with the VAV example, BMS controller 12 can identify the VAV as a terminal equipment object from its relationship with the conference room.

At step 1010, BMS controller 12 can identify relationships associated with each identified terminal equipment object. BMS controller 12 can identify direct relationships of the terminal equipment objects. Direct relationships may include relationships that allow building equipment associated with the terminal equipment object to operate. For example, an AHU may provide air to a VAV, meaning the AHU services the VAV and there is a relationship between the AHU and the VAV. The relationship allows the VAV to operate and provide air to an area. After identifying the relationships, at operation 1012, BMS controller 12 can identify serving equipment objects based on the relationships. Continuing with the AHU and VAV example, BMS controller 12 can identify a serving equipment object associated with the AHU based on the AHU's relationship with the VAV.

At step 1014, BMS controller 12 can connect the terminal equipment objects with the serving equipment objects so they can warm-up and cool-down at the same time. In some embodiments, one of the terminal and the serving equipment associated with their respective equipment objects can take longer to warm-up or cool-down than the building equipment they have a relationship with. In these instances, BMS controller 12 can automatically determine how long it takes for each of them to warm-up/cool-down and adjust when they start to warm-up/cool down so they can begin operating at the same time.

Figure 11A:
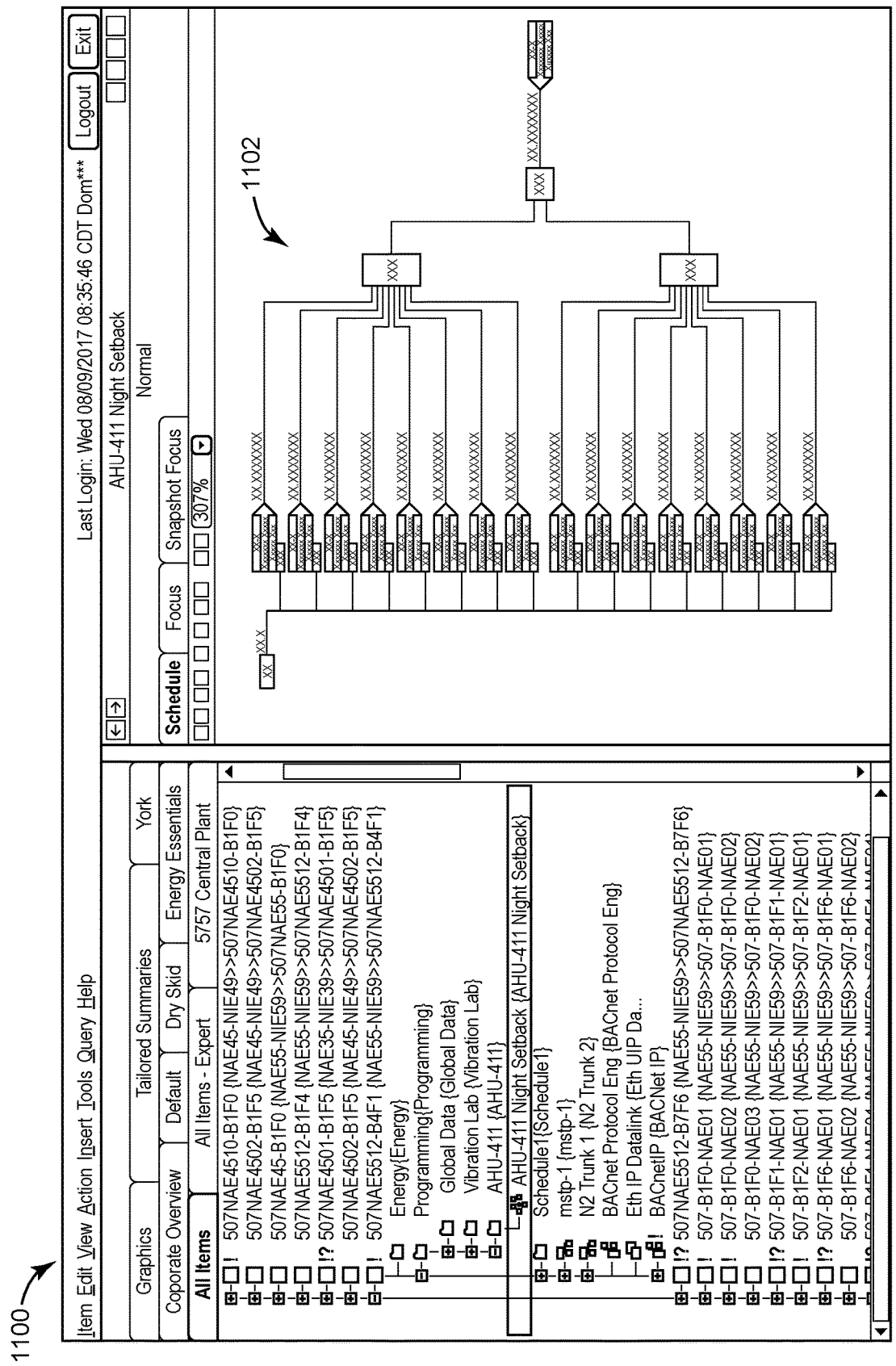
FIG. 11A is an illustration of a graphical user interface showing desired zone temperatures of different areas while operating in a night setback schedule, according to some embodiments.

Referring now to FIG. 11A, an illustration of a graphical user interface 1100 showing desired zone temperatures of different areas while operating in a night setback schedule is shown, according to some embodiments. User interface 1100 shows x's on the lines that indicate which building objects are connected and have a relationship with each other. A zoomed in view of the user interface is shown and discussed in reference to FIG. 11B below.

Figure 11B:
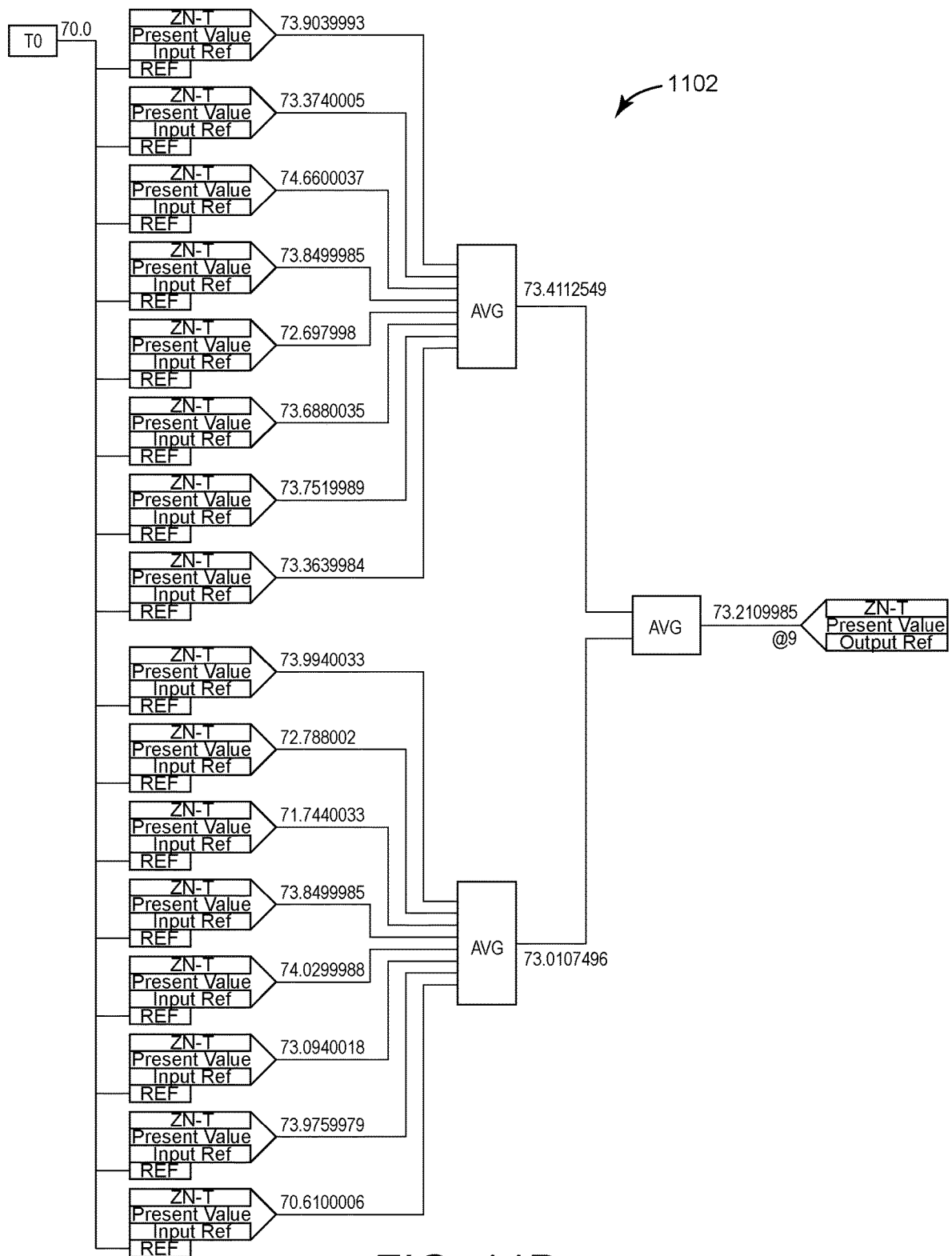
FIG. 11B is an illustration of a zoomed in view of the illustration of FIG. 11A showing temperature data from different zones while operating in a night netback schedule, according to some embodiments.

Referring now to FIG. 11B, an illustration of a portion 1102 of graphical user interface 1100 is shown, according to some embodiments. Portion 1102 shows different zone temperatures that are taken so a controller (not shown) can automatically determine which building equipment such as, but not limited to the AHU and RTU, to change the configurations of to reach a setpoint. When operating under the systems and methods described herein, the controller can automatically determine which building equipment to change configurations based on the building equipment's relationship with each other. Previous controllers would control a system in night setback mode by creating an LCT object and finding the min, max, or average temperatures of terminal to determine when to start an AHU/RTU during unoccupied hours.

Figure 11C:
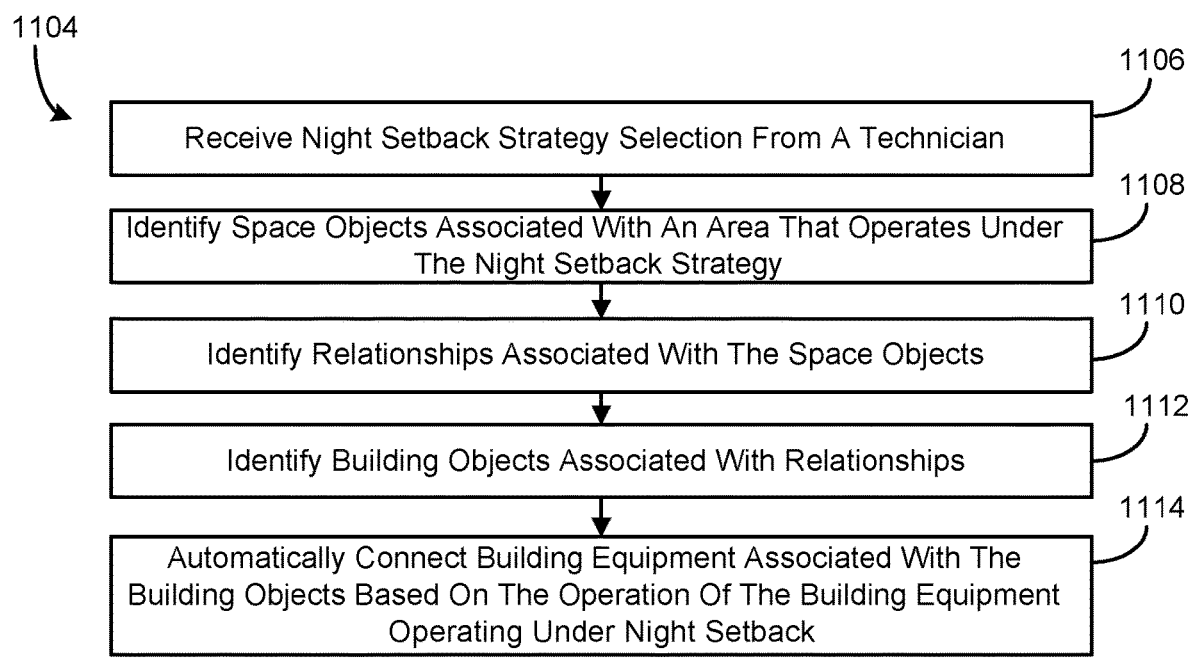
FIG. 11C is a flowchart of a process for automatically connecting building equipment based on relationships of the building equipment and how the building equipment operates in night setback mode, according to some embodiments.

Referring now to FIG. 11C, a flowchart of a process 1104 for automatically connecting building equipment based on relationships of the building equipment and how the building equipment operates in night setback mode is shown, according to some embodiments. Process 1104 includes receive night setback strategy selection from a technician (step 1106), identify space objects of the areas associated with the night setback strategy (step 1108), identify relationships associated with the space objects (step 1110), identify equipment objects associated with the relationships (step 1112), and connect the equipment objects based on their relationships (step 1114).

At step 1106, a technician can select, via BMS controller 12, a night setback strategy selection from a technician that indicates how building equipment operates at night in an unoccupied building. The night setback strategy can include desired setpoints for different areas of the building. At step 1108, BMS controller 12, can identify space objects associated with the areas of the night setback strategy from building object database 142. BMS controller 12 can identify any number of spaces. At step 1110, BMS controller 12 can identify relationships between the space objects and equipment objects associated with building equipment that serves the areas associated with the space objects. BMS controller 12 can identify any number of relationships. In some embodiments, BMS controller 12 can identify relationships associated with air serving equipment to control air flow during the night.

At step 1112, BMS controller 12 can identify equipment objects associated with the relationships and the building equipment associated with the equipment objects. BMS controller 112 can identify equipment objects associated with all of the identified relationships and/or equipment objects associated with building equipment that impacts a specific characteristic of areas of the night setback strategy, such as air serving building equipment.

At step 1114, BMS controller 12 can connect the identified equipment objects based on their relationships so the building equipment associated with the equipment objects can operate together under the night setback strategy. Advantageously, a technician can connect the equipment objects so the associated building equipment can automatically change configurations in a night setback strategy without the technician manually configuring each piece of building equipment.

Figure 12A:
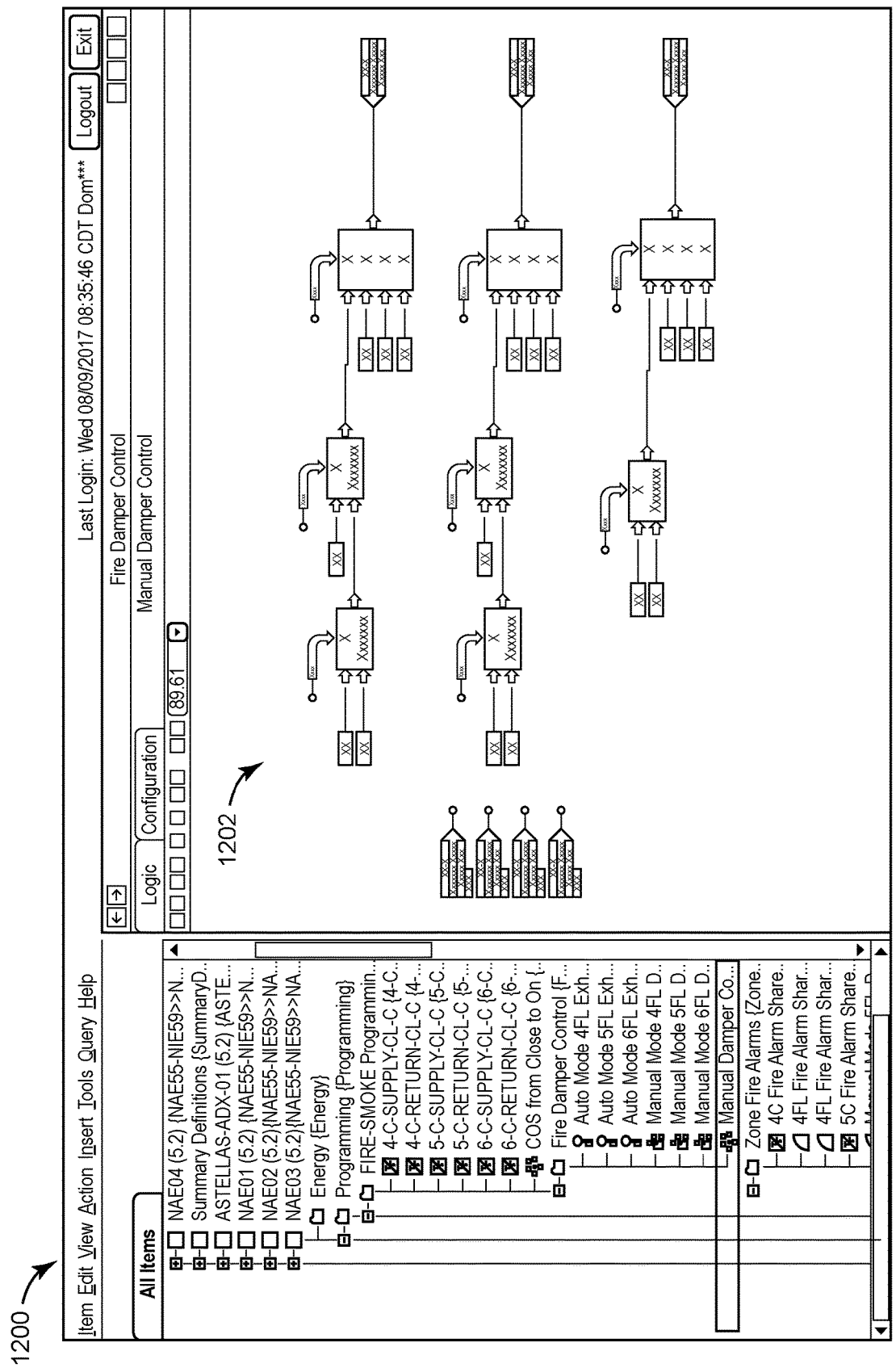
FIG. 12A is an illustration of a graphical user interface showing the manual damper control relationships between different dampers, according to some embodiments.

Referring now to FIG. 12A, an illustration of a graphical user interface 1200 showing the workflow of a building management system including different dampers and their operations is shown, according to some embodiments. Graphical user interface 1200 is shown to include a control portion 1202. Control portion 1202 includes a flow diagram with x's in each box. The boxes are representative of dampers that are connected to operate during a fire event. The x's are replaced with numbers and words representing which dampers are being described and are connected to each other in the illustration of FIG. 12B as will be described below.

Figure 12B:
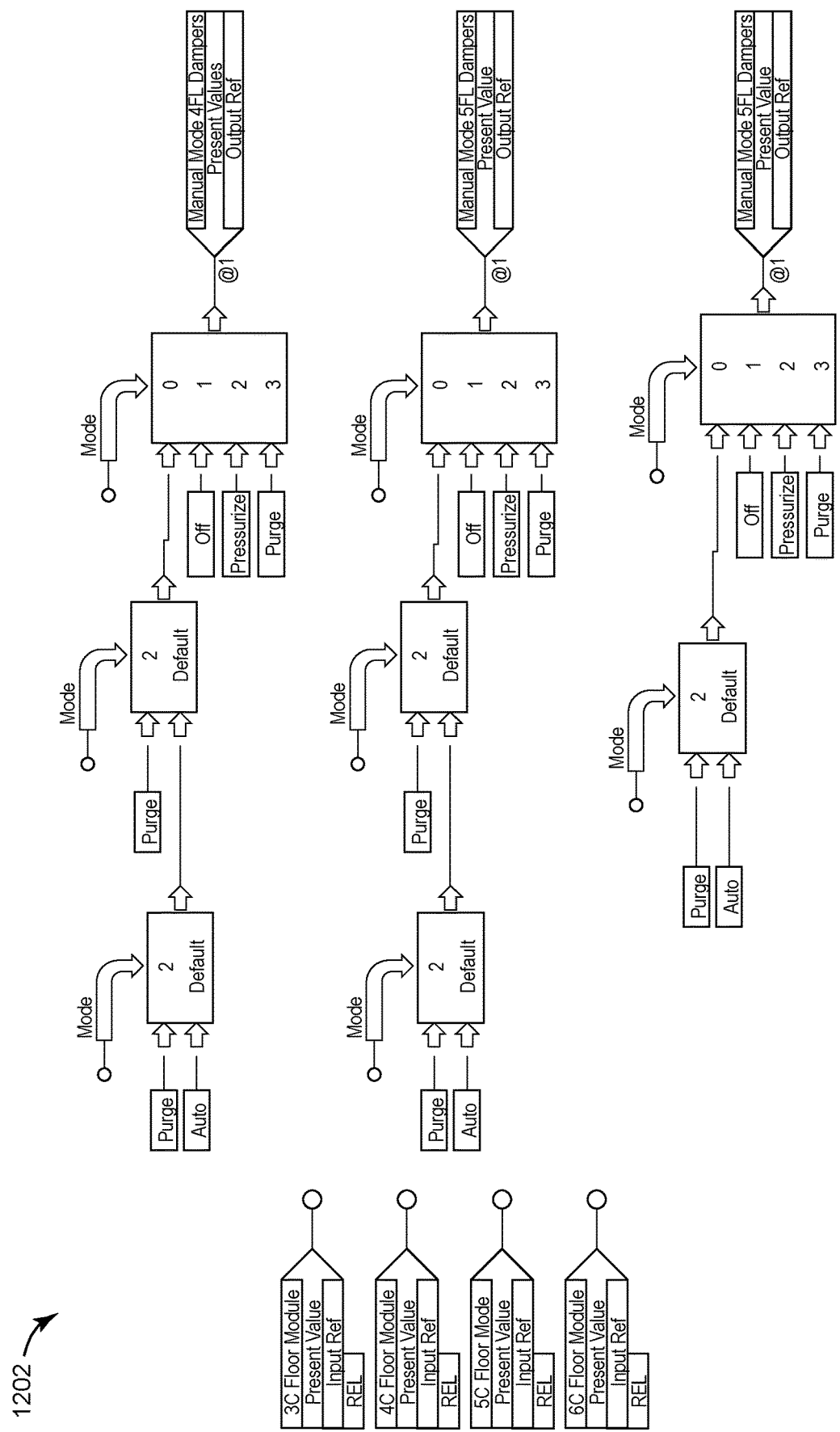
FIG. 12B is an illustration of a zoomed in portion of the graphical user interface of FIG. 12A showing a workflow of a building management system during a fire event, according to some embodiments.

Referring now to FIG. 12B, an illustration of portion 1202 of graphical user interface 1200 showing a workflow of a building management system during a fire event is shown, according to some embodiments. In the event of a fire, previous controllers could operate in a variety of manners. Some controllers close all fire dampers, some controllers close only certain floors, some controllers provide pressure to other floors, and some controllers shut down all air serving equipment. The variations can often dependent on the laws and standards of the area (such as municipal laws). Floor fire dampers are typically tied back to the nearest controller (such as a VAV box). A fire alarm point (single or multiple) may be brought into building object database 142 as a space object associated with a user created area or an equipment object as a controller. LCT logic is created to connect the fire alarm point to fire/smoke damper outputs and overriding air serving equipment in the event of a fire.

BMS controller 12 operating under the relationship model described herein may not need to perform the above steps. Instead, BMS controller 12 can control building equipment in the event of a fire by identifying relationships between building equipment and applying a fire schedule that determines equipment configurations based on sensory inputs. For example, if the fire is determined to be on the second floor of a three story building, thermometers and smoke detectors may send inputs to BMS controller 12 indicating a fire is on the second floor. BMS controller 12 can automatically determine configurations using fire schedules for fire/smoke dampers based on the fire being on the second floor and different relationships between the fire and smoke dampers. In some embodiments, BMS controller 12 may operate a plurality of fire schedules through the course of a fire as the fire moves, grows, and shrinks.

Figure 12C:
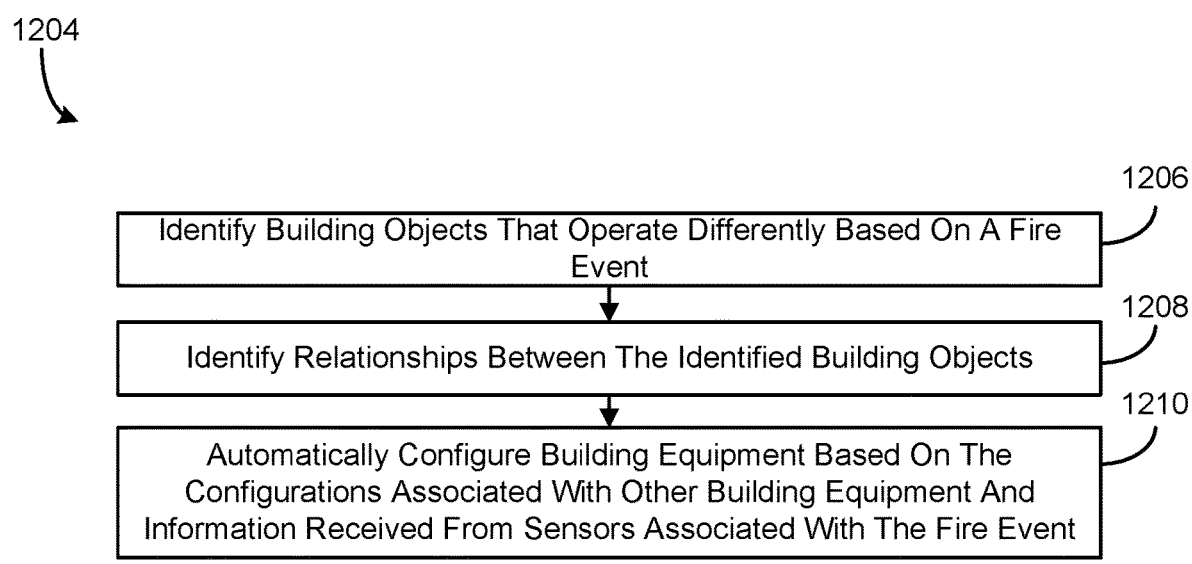
FIG. 12C is a flowchart of a process for automatically connecting building equipment based on relationships of the building equipment and how the building equipment operates during a fire event, according to some embodiments.

Referring now to FIG. 12C, a flowchart of a process 1204 for automatically connecting building equipment so the building equipment can operate during a fire event is shown, according to some embodiments. Process 1204 includes receive inputs indicating that there is a fire (step 1206), identify space objects associated with areas being affected by the fire (step 1208), identify relationships associated with the space objects (step 1210), identify equipment objects based on the relationships (step 1212), and connect the equipment objects based on the relationships (step 1214).

At step 1206, BMS controller 12 can receive sensory inputs indicating that there is a fire in a building. BMS controller 12 can determine where the fire is based on which sensor is sending data indicating that heat in the area is above a threshold used to determine if there is a fire. After receiving the sensory inputs, at step 1208, BMS controller 12 can identify space objects associated with areas being affected by the fire. In some instances, the fire can be spread out across multiple areas, in which case BMS controller can identify space objects for each area where the fire is.

At step 1210, BMS controller 12 can identify relationships associated with the space objects. The relationships can be with pieces of building equipment that change configurations in the event of a fire such as, but not limited to, dampers and air serving equipment. After identifying the relationships, at step 1212, BMS controller 12 can identify equipment objects associated with the space object and the identified relationships. The equipment objects can be associated with building equipment that changes configurations based on characteristics of a fire.

At step 1214, BMS controller 12 changes the configuration data of building equipment based on the sensory inputs received indicating that there is a fire. For example, if there is a fire on the third floor, a damper on the third floor may be closed to reduce the oxygen input to the fire. Using the relationships and identified equipment objects that were previously identified, the other dampers and air serving equipment of the third floor may also change their configurations. In some embodiments, BMS controller 12 can implement schedules, so if one damper is closed because of a fire, BMS controller 12 can automatically change the configurations of other building equipment in the building to help isolate the fire based on a fire schedule that is set when the closed damper closes.

Figure 13:
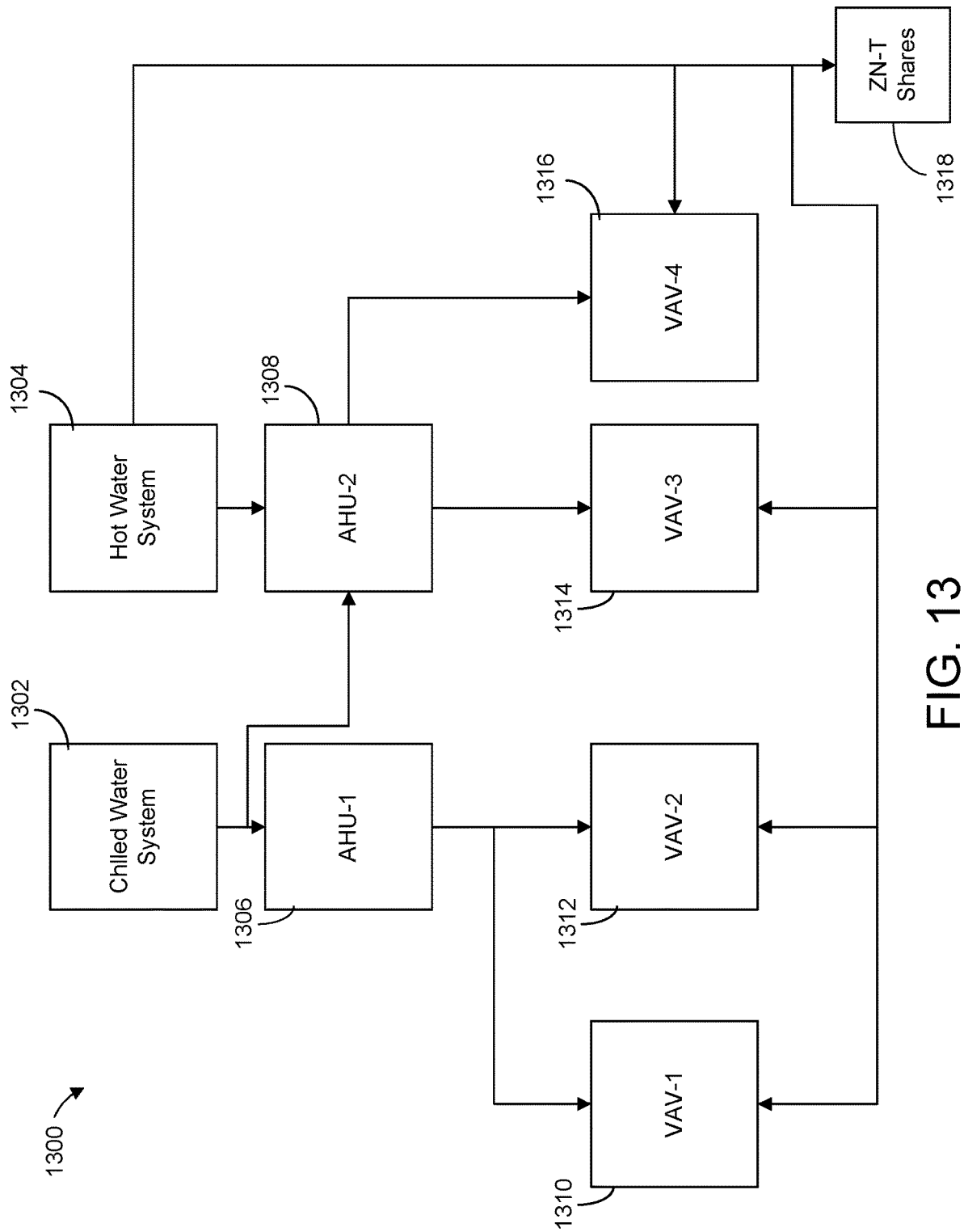
FIG. 13 is a block diagram showing equipment relationships, according to some embodiments.

Referring now to FIG. 13, a block diagram 1300 showing equipment relationships is shown, according to some embodiments. The block diagram shows a chilled water system 1302 related to an AHU 1306 and an AHU 1308. A hot water system 1304 is shown to be related to an AHU 1308, and to each of VAVs 1310-1316. AHU 1306 is shown to be related to VAVs 1310 and 1312. AHU 1308 is shown to be related to VAVs 1314 and 1316. Each component can be related to each other because one component services the other. For example, AHU 1306 can provide air to VAVs 1310 and 1312. Chilled water system 1302 can provide cold water to AHUs 1306 and 1308. Hot water system 1304 can provide hot water to AHU 1308 and each VAV 1310-1316. In some embodiments, hot water system 130 provides water to both AHUs 1306 and 1308. Further, hot water system 130 and VAVs 1310-1316 are shown to affect ZN-T shares 1318.

When air serving equipment (AHU, RTU, etc.) is associated to terminal equipment (VAVs, Unit Vent, etc.) the relationship model described herein can be used to dynamically create schedules and allow the operator to easily turn on/off control strategies with the equipment. If relationships are used, then when new equipment is added or changed the system logic and schedules can dynamically update.

Using points such as heating available and cooling available from the boiler/chiller to AHUs and VAVs prevents air equipment from using hot/chilled water when there is not any available. Examples of different schedules are static pressure reset, warm-up/cool-down, and night setback.

In one implementation, BMS controller 12 may stop two fan coils from operating against each other (e.g. one fan coil operates to heat a room while the other fan operates to cool the same room). In this implementation, BMS controller 12 can identify a space object associated with the space each fan coil is serving. BMS controller 12 can then identify the configuration of one of the fan coils. BMS controller 12 can then identify the relationship between the two fan coils as both serving the same space. Finally, BMS controller 12 can match configuration tags between the two fans, ensuring that each fan is operating to either cool or heat the room, depending on what a user selects as the input configuration to the first fan.

Figure 14:
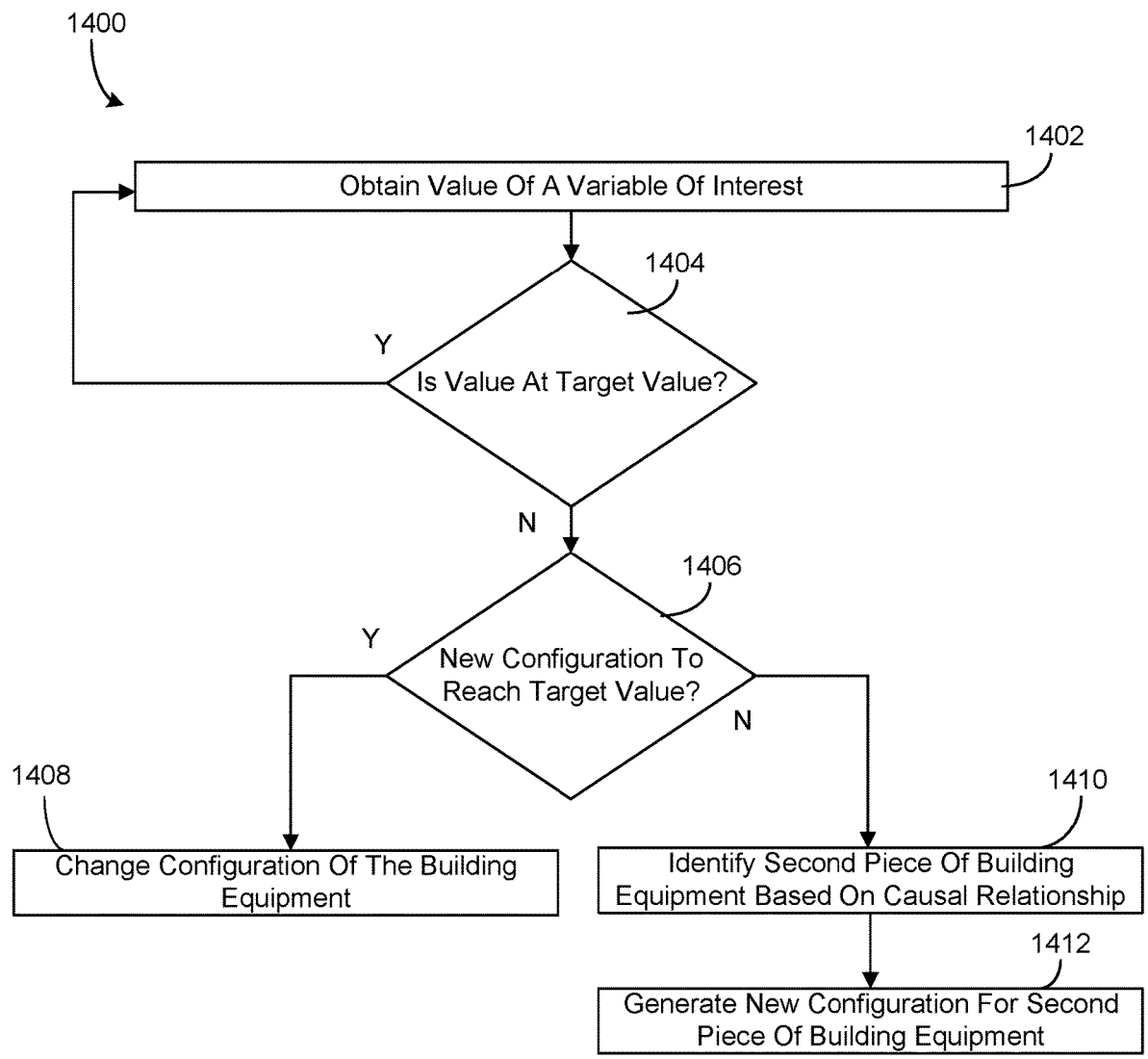
FIG. 14 is a flowchart of a process for automatically identifying a new configuration for a piece of building equipment based on a causal relationship between the piece of building equipment and another piece of building equipment, according to some embodiments.

Referring now to FIG. 14, a flowchart of a process 1400 for automatically identifying a new configuration for a piece of building equipment based on a causal relationship between the piece of building equipment and another piece of building equipment is shown, according to some embodiments. Process 1400 is shown to include obtain value of a variable of interest? (step 1402), is value at target value (step 1404), new configuration to reach target value? (step 1406), change configuration of the building equipment (step 1408), identify second piece of building equipment based on causal relationship (step 1410), and identify new configuration for second piece of building equipment (step 1412). Each of steps 1402-1412 can be conducted by BMS controller 12 to easily determine configurations based on causal relationships to ensure that a space in a building is being service properly.

At step 1402, BMS controller 12 can receive a value of a variable of interest from a sensor retrieving variable of interest values associated with a space. For example, a thermostat in a room can constantly take the temperature of the room and send the temperature to BMS controller 12. The temperature would be the variable of interest and the room would be the space. A variable of interest may be any value associated with a space, such as, but not limited to, water temperature, air temperature, air pressure, lighting, etc. A space may be any area and/or areas within areas.

At step 1404, BMS controller 12 can determine if the value is at a target value. The target value can be a value pre-determined by an administrator controlling BMS controller 12 with an external device or a value that is automatically determined by BMS controller 12 to be an appropriate value based on the time the value of the variable of interest is taken. An appropriate value can at the target value or within a range of values set by an administrator or determined by BMS controller 12. If the value of the variable of interest is at the target value, or within the range, BMS controller 12 does not need to perform any more steps and can wait for another value from a sensor at step 1402. In some embodiments, BMS controller 12 can poll sensors for values of variables of interest instead of waiting for values to ensure an associated building is operating appropriately. BMS controller 12 can identify a piece of building equipment that is associated with the value and the variable of interest. A piece of building equipment is associated with the value and variable of interest if the piece of building equipment services an associated with the value and affects the value. For example, a fan coil is associated with the temperature of a room because the fan coil operates to heat or cool the room depending on the configuration of the fan coil, in some embodiments.

If BMS controller 12 determines that the value is not at a target value or within a range of values, at step 1406, BMS controller 12 can determine if there is a new configuration for a piece of building equipment associated with the value that will bring the value to the target value. For example, continuing with the fan coil example, if BMS controller 12 determines that a room is too hot with a temperature value above the range of values, BMS controller 12 can determine if there is a configuration for a fan coil associated with the temperature that can operate to bring the temperature to within the range of values. If BMS controller 12 determines that there is a configuration for the fan coil, at step 1408, BMS controller 12 can change the configuration of the fan coil to do so. BMS controller 12 can change the configurations for any piece of building equipment to bring a target value associated with any variable of interest to be within a range of values.

If BMS controller 12 does not identify a new configuration for the building equipment that will bring a value of a variable of interest to within a range of values, at step 1410, BMS controller 12 can identify a second piece of building equipment operating in series with the first piece of building and change the configuration of the second piece of building equipment. The second piece of building equipment operates in series with the first piece of building equipment because the second piece of building equipment provides an input to the first piece of building equipment, in some embodiments. For example, in some embodiments, an AHU operates in series with a VAV because the AHU provides air to the VAV so the VAV can provide air to a room or space. In some embodiments, a VAV is limited in how much air it can provide to a space by how much air an associated AHU provides. Consequently, a VAV by itself can only provide as much air to a room or space as is provided by an AHU and the VAV and AHU have a causal relationship. The relationship can be stored in relationship database 152.

BMS controller 12 is configured to identify second pieces of building equipment using relationships within relationship database 152 of BMS controller 12, in some embodiments. To identify the second pieces of building equipment, BMS controller 12 can identify a first equipment object associated with a first piece of building equipment within building object database 142. BMS controller 12 can identify all relationships associated with the first equipment object. The relationships can be to space objects and/or to other equipment objects that represent building equipment that serves the same space. In some embodiments, BMS controller 12 only identifies causal relationships associated with the first building object, or relationships with equipment objects associated with building equipment that provide an input to the first piece of building equipment. Advantageously, by only identifying causal relationships, BMS controller 12 can streamline the processing power needed to identify building equipment that serves other building equipment because BMS controller 12 may not search for building equipment that simply serves the same space instead of providing inputs to each other.

Using the causal relationships, BMS controller 12 can identify an equipment object associated with a piece of building equipment that provides an input to a first piece of building equipment. For example, if BMS controller 12 determines that a VAV cannot provide enough air to serve a space, BMS controller 12 can identify an equipment object within building object database 142 associated with the VAV. BMS controller 12 can identify all relationships associated with the equipment objects from relationship database 142. BMS controller 12 can then identify an equipment object associated with an AHU that provides an air input to the VAV using a causal relationship identified from relationship database 142.

At step 1412, BMS controller 12 can generate a new configuration for a second piece of building equipment identified to have a causal relationship with a first piece of building equipment. BMS controller 12 can generate the new configuration by generating configuration data for a building object associated with the second piece of building equipment within building object database 142. In some embodiments, BMS controller 12 by generating the configuration data for the equipment object, BMS controller 12 changes the configuration of the building object. For example, if a VAV is determined to not be able to provide enough air to service a room and an AHU is determined to provide air to the VAV, BMS controller 12 can generate new configuration data for the AHU so the AHU provides enough air to the VAV so the VAV can properly service the room.

In some embodiments, BMS controller 12 identifies causal relationships between a piece of building equipment and multiple other pieces of building equipment that the piece of building equipment serves. Upon identifying the piece of building equipment, BMS controller 12 can generate configuration data for the piece of building equipment based on the configurations of the multiple pieces of building equipment to drive a variable of interest to a target value. For example, if there are multiple VAVs that operate to provide air to a room and one AHU provides air to each VAV, BMS controller 12 can identify the causal relationships between the AHU and the VAVs and change the AHUs configuration based on how much air all of the VAVs need to provide to the room.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system, comprising:
   a memory storing relationships between a plurality of building objects representing building equipment and building spaces; and
   a processor configured to:
   obtain configuration data associated with a first building object of the plurality of building objects, the first building object corresponding to a first piece of building equipment and having one or more stored attributes that indicate relationships the first building object has with other building objects of the plurality of building objects, the configuration data associated with the first building object indicating an operation of the first piece of building equipment affecting a point of the building management system;
   identify a second building object based on a relationship the first building object has with the second building object in the one or more stored attributes, the second building object corresponding to a second piece of building equipment;
   automatically generate configuration data for the second building object based on the configuration data associated with the first building object and the relationship with the second building object; and
   change a configuration of the second piece of building equipment using the generated configuration data for the second building object to change how the second piece of building equipment affects the point.

2. The building management system of claim 1, wherein the relationships between the plurality of building objects represent connections between different pieces of building equipment that cooperate to perform a common function.

3. The building management system of claim 1, wherein the processor is configured to obtain the configuration data based on a configuration schedule, wherein the configuration schedule is based on at least one of static pressure reset strategies, warm-up/cool-down strategies, heating schedules, cooling schedules, night setback strategies, discharge air temperature, demand ventilation, demand response, pressure dependent zoning, central plant optimization, model predictive/artificial intelligence control, heavy equipment delay, alarm suppression, global data shares, interlocks, multiple commands, or fire emergency strategies.

4. The building management system of claim 3, wherein the processor is further configured to identify a space object representative of a building space based on the configuration schedule and wherein the first building object is representative of building equipment that serves the building space.

5. The building management system of claim 1, wherein the processor is further configured to identify a change in configuration data of the first building object and, in response to identifying the change, automatically change the configuration data of the second building object.

6. The building management system of claim 1, wherein the processor is further configured to tag the first building object with a first configuration tag representing the current configuration of the first building object and tag the second building object with a second configuration tag corresponding to the first configuration tag.

7. The building management system of claim 1, wherein the processor is further configured to:
   tag a space object with tags representing pieces of building equipment that serve a building space corresponding to the space object;
   identify a third equipment object associated with one piece of building equipment of the pieces of building equipment as a third building object;
   generate configuration data for equipment objects representing other pieces of building equipment that serve the building space based on configuration data associated with the third equipment object.

8. The building management system of claim 1, wherein the processor is further configured to:
   identify a space object representative of a building space of the building spaces; and
   obtain configuration data associated with the space object based on a mode of operation that controls configurations of the building equipment that serve the building space.

9. A method for generating new configuration data based on relationships between building objects, the method comprising:
   providing a memory storing relationships between a plurality of building objects representing building equipment and building spaces; and
   providing a processor configured to:
   obtain configuration data associated with a first building object of the plurality of building objects, the first building object corresponding to a first piece of building equipment and having one or more stored attributes indicating relationships the first building object has with other building objects of the plurality of building objects, the configuration data associated with the first building object indicating an operation of the first piece of building equipment affecting a point of a building management system;
   identify a second building object based on a relationship the first building object has with the second building object in the one or more stored attributes, the second building object corresponding to a second piece of building equipment;
   automatically generate configuration data for the second building object based on the configuration data associated with the first building object and the relationship with the second building object; and
   change a configuration of the second piece of building equipment using the generated configuration data for the second building object to change how the second piece of building equipment affects the point.

10. The method of claim 9, wherein the relationships between the plurality of building objects represent connections between different pieces of building equipment that cooperate to perform a common function.

11. The method of claim 9, wherein the processor is further configured to:
    tag a space object with tags representing pieces of building equipment that serve a building space corresponding to the space object;
    identify a third equipment object associated with one piece of building equipment of the pieces of building equipment as a third building object;

generate configuration data for equipment objects representing other pieces of building equipment that serve the building space based on configuration data associated with the third equipment object.

12. The method of claim 9, wherein the processor is configured to obtain the configuration data based on a configuration schedule, wherein the configuration schedule is based on at least one of static pressure reset strategies, warm-up/cool-down strategies, heating schedules, cooling schedules, night setback strategies, discharge air temperature, demand ventilation, demand response, pressure dependent zoning, central plant optimization, model predictive/artificial intelligence control, heavy equipment delay, alarm suppression, global data shares, interlocks, multiple commands, and fire emergency strategies.

13. The method of claim 12, wherein the processor is further configured to identify a space object representative of a building space based on the configuration schedule and wherein the first building object is representative of building equipment that serves the building space.

14. A building management system, comprising:
a memory storing causal relationships between a plurality of building objects representing building equipment and building spaces; and
a processor configured to:
obtain a value of a variable of interest associated with a piece of building equipment of the building equipment;
determine if the value is at a target value;
if the value is not at the target value, determine if there is a new configuration for the piece of building equipment of the building equipment to drive the variable of interest to the target value;
if there is not a new configuration, identify a second piece of building equipment of the building equipment that provides an input to the piece of building equipment based on a causal relationship of the causal relationships;
automatically generate a new configuration for the second piece of building equipment based on configuration data associated with the piece of building equipment and the causal relationship to drive the variable of interest to the target value; and
change a configuration of the second piece of building equipment using the generated new configuration for the second piece of building equipment.

15. The building management system of claim 14, wherein the processor is further configured to:
identify causal relationships between the second piece of building equipment and a plurality of pieces of building equipment, each piece of building equipment of the plurality of pieces of building equipment servicing a space of the building spaces;
wherein the processor is configured to automatically generate the new configuration for the second piece of building equipment based further on configurations of the plurality of pieces of building equipment.

16. The building management system of claim 14, wherein the causal relationships are relationships between building objects associated with pieces of building equipment that provide inputs to second pieces of building equipment and second building objects associated with the second pieces of building equipment.

* * * * *